(12) United States Patent
Patterson

(10) Patent No.: US 8,078,629 B2
(45) Date of Patent: *Dec. 13, 2011

(54) DETECTING SPAM DOCUMENTS IN A PHRASE BASED INFORMATION RETRIEVAL SYSTEM

(75) Inventor: Anna Lynn Patterson, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/578,339

(22) Filed: Oct. 13, 2009

(65) Prior Publication Data

US 2011/0131223 A1 Jun. 2, 2011

Related U.S. Application Data

(63) Continuation of application No. 11/478,330, filed on Jun. 28, 2006, now Pat. No. 7,603,345.

(51) Int. Cl.
*G06F 17/30* (2006.01)

(52) U.S. Cl. .......................... 707/754; 707/750; 707/737

(58) Field of Classification Search ........... 707/999.001, 707/999.003, 736, 723, 705, 737, 750, 754
See application file for complete search history.

(56) References Cited

U.S. PATENT DOCUMENTS

| | | | |
|---|---|---|---|
| 5,278,980 A | 1/1994 | Pedersen et al. | |
| 5,321,833 A | 6/1994 | Chang et al. | |
| 5,495,567 A | 2/1996 | Iizawa et al. | |
| 5,523,946 A | 6/1996 | Kaplan et al. | |
| 5,659,732 A | 8/1997 | Kirsch | |
| 5,668,987 A | 9/1997 | Schneider | |
| 5,694,593 A | 12/1997 | Baclawski | |
| 5,696,962 A | 12/1997 | Kupiec | |
| 5,715,443 A | 2/1998 | Yanagihara et al. | |
| 5,721,897 A | 2/1998 | Rubinstein | |
| 5,724,571 A | 3/1998 | Woods | |
| 5,754,939 A | 5/1998 | Herz et al. | |
| 5,757,917 A | 5/1998 | Rose et al. | |
| 5,771,378 A | 6/1998 | Holt et al. | |
| 5,826,261 A | 10/1998 | Spencer | |
| 5,832,470 A * | 11/1998 | Morita et al. ........................ | 1/1 |
| 5,835,087 A | 11/1998 | Herz et al. | |
| 5,845,278 A | 12/1998 | Kirsch et al. | |
| 5,915,249 A | 6/1999 | Spencer | |
| 5,920,854 A | 7/1999 | Kirsch et al. | |
| 5,956,722 A | 9/1999 | Jacobson et al. | |
| 5,960,383 A | 9/1999 | Fleischer | |

(Continued)

FOREIGN PATENT DOCUMENTS

JP 02270067 11/1990

(Continued)

OTHER PUBLICATIONS

Ntoulas et al., "Detecting Spam Web Pages though Content Analysis", WWW 2006, May 23-26, pp. 1-10.*

(Continued)

*Primary Examiner* — Hung T Vy
*Assistant Examiner* — Phuong Thao Cao

(57) ABSTRACT

An information retrieval system uses phrases to index, retrieve, organize and describe documents. Phrases are identified that predict the presence of other phrases in documents. Documents are the indexed according to their included phrases. A spam document is identified based on the number of related phrases included in a document.

36 Claims, 6 Drawing Sheets

U.S. PATENT DOCUMENTS

| | | | |
|---|---|---|---|
| 5,983,216 A | 11/1999 | Kirsch et al. | |
| 6,018,733 A | 1/2000 | Kirsch et al. | |
| 6,070,158 A | 5/2000 | Kirsch et al. | |
| 6,085,186 A | 7/2000 | Christianson et al. | |
| 6,098,034 A * | 8/2000 | Razin et al. | 704/9 |
| 6,178,419 B1 | 1/2001 | Legh-Smith et al. | |
| 6,185,550 B1 | 2/2001 | Snow et al. | |
| 6,185,558 B1 | 2/2001 | Bowman et al. | |
| 6,298,344 B1 | 10/2001 | Inaba et al. | |
| 6,349,316 B2 | 2/2002 | Fein et al. | |
| 6,363,377 B1 | 3/2002 | Kravets et al. | |
| 6,366,911 B1 | 4/2002 | Christy | |
| 6,366,933 B1 | 4/2002 | Ball et al. | |
| 6,415,283 B1 | 7/2002 | Conklin | |
| 6,470,307 B1 | 10/2002 | Turney | |
| 6,499,030 B1 | 12/2002 | Igata | |
| 6,542,888 B2 | 4/2003 | Marques | |
| 6,549,895 B1 | 4/2003 | Lai | |
| 6,571,240 B1 * | 5/2003 | Ho et al. | 1/1 |
| 6,594,658 B2 | 7/2003 | Woods | |
| 6,596,030 B2 | 7/2003 | Ball et al. | |
| 6,606,639 B2 | 8/2003 | Jacobson et al. | |
| 6,638,314 B1 | 10/2003 | Meyerzon et al. | |
| 6,654,739 B1 | 11/2003 | Apte et al. | |
| 6,684,183 B1 | 1/2004 | Korall et al. | |
| 6,691,106 B1 | 2/2004 | Sathyanarayan | |
| 6,697,793 B2 | 2/2004 | McGreevy | |
| 6,721,728 B2 | 4/2004 | McGreevy | |
| 6,741,981 B2 | 5/2004 | McGreevy | |
| 6,741,982 B2 | 5/2004 | Soderstrom et al. | |
| 6,741,984 B2 | 5/2004 | Zaiken et al. | |
| 6,769,016 B2 * | 7/2004 | Rothwell et al. | 709/206 |
| 6,772,150 B1 | 8/2004 | Whitman et al. | |
| 6,778,979 B2 | 8/2004 | Grefenstette et al. | |
| 6,778,980 B1 | 8/2004 | Madan et al. | |
| 6,820,237 B1 | 11/2004 | Abu-Hakima et al. | |
| 6,823,333 B2 | 11/2004 | McGreevy | |
| 6,832,224 B2 | 12/2004 | Gilmour | |
| 6,839,682 B1 | 1/2005 | Blume et al. | |
| 6,859,800 B1 | 2/2005 | Roche et al. | |
| 6,862,710 B1 | 3/2005 | Marchisio | |
| 6,886,010 B2 | 4/2005 | Kostoff | |
| 6,910,003 B1 | 6/2005 | Arnold et al. | |
| 6,947,930 B2 | 9/2005 | Anick et al. | |
| 6,963,867 B2 | 11/2005 | Ford et al. | |
| 6,978,274 B1 * | 12/2005 | Gallivan et al. | 1/1 |
| 6,981,040 B1 | 12/2005 | Konig et al. | |
| 6,983,345 B2 | 1/2006 | Lapir et al. | |
| 6,997,793 B1 | 2/2006 | Ito | |
| 7,017,114 B2 | 3/2006 | Guo et al. | |
| 7,028,026 B1 | 4/2006 | Yang et al. | |
| 7,028,045 B2 | 4/2006 | Franz et al. | |
| 7,051,014 B2 | 5/2006 | Brill et al. | |
| 7,051,023 B2 | 5/2006 | Kapur et al. | |
| 7,051,024 B2 | 5/2006 | Fein et al. | |
| 7,058,589 B1 | 6/2006 | Leamon et al. | |
| 7,085,771 B2 * | 8/2006 | Chung et al. | 1/1 |
| 7,089,236 B1 | 8/2006 | Stibel | |
| 7,137,062 B2 | 11/2006 | Kaufman et al. | |
| 7,137,065 B1 | 11/2006 | Huang et al. | |
| 7,139,756 B2 | 11/2006 | Cooper et al. | |
| 7,149,748 B1 | 12/2006 | Stephan | |
| 7,151,864 B2 | 12/2006 | Henry et al. | |
| 7,155,243 B2 | 12/2006 | Baldwin et al. | |
| 7,158,983 B2 | 1/2007 | Willse et al. | |
| 7,171,619 B1 | 1/2007 | Bianco | |
| 7,194,483 B1 | 3/2007 | Mohan et al. | |
| 7,200,802 B2 | 4/2007 | Kawatani | |
| 7,206,389 B1 | 4/2007 | Dumoulin et al. | |
| 7,240,064 B2 | 7/2007 | Risvik et al. | |
| 7,243,092 B2 | 7/2007 | Woehler et al. | |
| 7,254,580 B1 | 8/2007 | Gharachorloo et al. | |
| 7,263,530 B2 | 8/2007 | Hu et al. | |
| 7,328,401 B2 | 2/2008 | Obata et al. | |
| 7,346,839 B2 | 3/2008 | Acharya et al. | |
| 7,356,527 B2 | 4/2008 | Carmel et al. | |
| 7,395,501 B2 | 7/2008 | Graham et al. | |
| 7,426,507 B1 | 9/2008 | Patterson | |
| 7,454,449 B2 | 11/2008 | Plow et al. | |
| 7,464,264 B2 * | 12/2008 | Goodman et al. | 713/154 |
| 7,483,820 B2 | 1/2009 | Yang | |
| 7,483,871 B2 | 1/2009 | Herz | |
| 7,536,408 B2 | 5/2009 | Patterson | |
| 7,562,066 B2 | 7/2009 | Kawatani | |
| 7,567,959 B2 | 7/2009 | Patterson | |
| 7,580,921 B2 | 8/2009 | Patterson | |
| 7,580,929 B2 | 8/2009 | Patterson | |
| 7,584,175 B2 | 9/2009 | Patterson | |
| 7,599,914 B2 | 10/2009 | Patterson | |
| 7,603,345 B2 | 10/2009 | Patterson | |
| 7,702,618 B1 | 4/2010 | Patterson | |
| 7,711,679 B2 | 5/2010 | Patterson | |
| 7,743,045 B2 * | 6/2010 | Guha | 707/706 |
| 2001/0000356 A1 | 4/2001 | Woods | |
| 2001/0021938 A1 | 9/2001 | Fein et al. | |
| 2002/0042707 A1 | 4/2002 | Zhao et al. | |
| 2002/0042793 A1 | 4/2002 | Choi | |
| 2002/0046018 A1 | 4/2002 | Marcu et al. | |
| 2002/0046081 A1 | 4/2002 | Albazz et al. | |
| 2002/0052901 A1 | 5/2002 | Guo et al. | |
| 2002/0065857 A1 | 5/2002 | Michalewicz et al. | |
| 2002/0078090 A1 | 6/2002 | Hwang et al. | |
| 2002/0091671 A1 | 7/2002 | Prokoph | |
| 2002/0138467 A1 | 9/2002 | Jacobson et al. | |
| 2002/0143524 A1 | 10/2002 | O'Neil et al. | |
| 2002/0147578 A1 | 10/2002 | O'Neil et al. | |
| 2002/0174113 A1 * | 11/2002 | Kanie et al. | 707/3 |
| 2002/0188587 A1 | 12/2002 | McGreevy | |
| 2002/0188599 A1 | 12/2002 | McGreevy | |
| 2003/0031996 A1 * | 2/2003 | Robinson | 434/350 |
| 2003/0037041 A1 | 2/2003 | Hertz | |
| 2003/0051214 A1 | 3/2003 | Graham et al. | |
| 2003/0069877 A1 | 4/2003 | Grefenstette et al. | |
| 2003/0078913 A1 | 4/2003 | McGreevy | |
| 2003/0093790 A1 | 5/2003 | Logan et al. | |
| 2003/0130993 A1 | 7/2003 | Mendelevitch et al. | |
| 2003/0140309 A1 | 7/2003 | Saito et al. | |
| 2003/0144995 A1 | 7/2003 | Franz et al. | |
| 2003/0195877 A1 | 10/2003 | Ford et al. | |
| 2003/0195937 A1 * | 10/2003 | Kircher et al. | 709/207 |
| 2004/0006736 A1 | 1/2004 | Kawatani | |
| 2004/0034633 A1 | 2/2004 | Rickard | |
| 2004/0052433 A1 | 3/2004 | Henry et al. | |
| 2004/0064438 A1 * | 4/2004 | Kostoff | 707/1 |
| 2004/0068396 A1 | 4/2004 | Kawatani | |
| 2004/0133590 A1 | 7/2004 | Simske | |
| 2004/0148330 A1 * | 7/2004 | Alspector et al. | 709/200 |
| 2004/0153456 A1 | 8/2004 | Charnock et al. | |
| 2004/0158580 A1 | 8/2004 | Carmel et al. | |
| 2004/0186824 A1 * | 9/2004 | Delic et al. | 707/3 |
| 2004/0186827 A1 | 9/2004 | Anick et al. | |
| 2004/0225667 A1 | 11/2004 | Hu et al. | |
| 2004/0260692 A1 | 12/2004 | Brill et al. | |
| 2005/0043015 A1 * | 2/2005 | Muramatsu | 455/412.1 |
| 2005/0043940 A1 | 2/2005 | Elder | |
| 2005/0060295 A1 | 3/2005 | Gould et al. | |
| 2005/0060651 A1 | 3/2005 | Anderson | |
| 2005/0071310 A1 | 3/2005 | Eiron et al. | |
| 2005/0071328 A1 | 3/2005 | Lawrence | |
| 2005/0076084 A1 * | 4/2005 | Loughmiller et al. | 709/206 |
| 2005/0154723 A1 | 7/2005 | Liang | |
| 2005/0165778 A1 | 7/2005 | Obata et al. | |
| 2005/0198559 A1 | 9/2005 | Fujiwara | |
| 2005/0216564 A1 * | 9/2005 | Myers et al. | 709/206 |
| 2005/0256848 A1 | 11/2005 | Alpert et al. | |
| 2005/0278620 A1 * | 12/2005 | Baldwin et al. | 715/513 |
| 2006/0018551 A1 | 1/2006 | Patterson | |
| 2006/0020571 A1 | 1/2006 | Patterson | |
| 2006/0020607 A1 | 1/2006 | Patterson | |
| 2006/0031195 A1 | 2/2006 | Patterson | |
| 2006/0036593 A1 | 2/2006 | Dean et al. | |
| 2006/0053157 A1 | 3/2006 | Pitts | |
| 2006/0106792 A1 | 5/2006 | Patterson | |
| 2006/0143174 A1 | 6/2006 | Dey et al. | |
| 2006/0143714 A1 | 6/2006 | Peterson et al. | |
| 2006/0184500 A1 * | 8/2006 | Najork et al. | 707/1 |
| 2006/0200464 A1 | 9/2006 | Gideoni et al. | |

| | | | |
|---|---|---|---|
| 2006/0294124 | A1 | 12/2006 | Cho |
| 2007/0011347 | A1* | 1/2007 | George et al. .................. 709/235 |
| 2007/0055642 | A1* | 3/2007 | Kim et al. .......................... 707/1 |
| 2007/0239671 | A1 | 10/2007 | Whitman et al. |
| 2007/0244884 | A1 | 10/2007 | Yang |
| 2008/0005064 | A1 | 1/2008 | Sarukkai |
| 2008/0263202 | A1* | 10/2008 | George et al. .................. 709/224 |
| 2008/0306943 | A1 | 12/2008 | Patterson et al. |
| 2009/0070312 | A1 | 3/2009 | Patterson |
| 2010/0161625 | A1 | 6/2010 | Patterson |
| 2010/0169305 | A1 | 7/2010 | Patterson |
| 2010/0281535 | A1* | 11/2010 | Perry et al. ...................... 726/22 |

FOREIGN PATENT DOCUMENTS

| | | |
|---|---|---|
| JP | 2002132789 | 5/2002 |
| JP | 2003281183 | 10/2003 |
| JP | 2004046438 | 2/2004 |
| JP | 2004139150 | 5/2004 |
| WO | 9738390 | 10/1997 |
| WO | 2009033098 A1 | 3/2009 |

OTHER PUBLICATIONS

Fetterly et al., "Detecting Phrase-Level Duplication on the World Wide Web", SIGIR'05, Aug. 15-19, pp. 1-8.*

Extended European Search Report for EP Application No. 06719537.0, mailed Apr. 16, 2010, 6 pages.

Taniar, D., et al, "A Taxonomy of Indexing Schemes for Parallel Database Systems", Distributed and Parallel Databases, vol. 12, No. 1, Jul. 2002, pp. 73-106.

Byeong-Soo, J., et al, "Inverted File Partitioning Schemes in Multiple Disk Systems", IEEE Transactions on Parallel and Distributed Systems, vol. 6, No. 2, Feb. 1, 1995, pp. 142-153.

Kataoka, "Keyword Extraction from Text Information and Related Information Collection System", Journal of Japan Society for Fuzzy Theory and Systems, vol. 9, No. 5, Oct. 15, 1997, pp. 710-716.

Office Action for Japanese Application No. 2005-216530 (with English Translation), mailed Nov. 30, 2010, 13 pages.

Office Action for Japanese Application No. 2005-216528 (with English Translation), mailed Nov. 2, 2010, 6 pages.

Office Action for European Application No. 05254644.7, mailed Sep. 17, 2010, 6 pages.

Office Action for CA Application No. 2,595,674, mailed Jun. 14, 2010, 3 pages.

Non-Final Office Action for U.S. Appl. No. 12/717,687, mailed Jan. 5, 2011, 39 pages.

Non-Final Office Action for U.S. Appl. No. 12/717,663, mailed Jan. 5, 2011, 38 pages.

Non-Final Office Action for U.S. Appl. No. 11/851,962, mailed Nov. 12, 2010, 35 pages.

Stanfill, C., et al, "Information Retrieval on The Connection Machine: 1 TO 8192 Gigabytes", Information Processing and Management, vol. 27, No. 4, 1991, pp. 285-310.

Stanfill, C., "Partitioned Posting Files: A Parallel Inverted File Structure for Information Retrieval", Paper presented at the International Conference on Research and Development in Information Retrieval, Sep. 1990, pp. 413-428.

Tomasic, A, et al, "Caching And Database Scaling in Distributed Shared-Nothin Information Retrieval Systems", ACM, 1993, pp. 129-138.

Tomasic, A, et al, "Caching and Database Scaling in Distributed Shared-Nothing Information Retrieval Systems", Stanford University Computer Science Technical Report STAN-CS-92-1456, Dec. 22, 1992, 21 pages.

Tomasic, A, "Performance of Inverted Indices in Distributed Text Document Retrieval Systems", Standford University Computer Science Technical Report STAN-CS-92-1434, Jun. 23, 1992, 25 pages.

Tomasic, A, et al, "Performance of Inverted Indices in Shared-Nothing Distributed Text Document Information Retrieval Systems", Proceedings of the Second International Conference on Parallel and Distributed Information Systems, 1993, 10 pages.

Tomasic, A, et al, "Query Processing and Inverted Indices in Shared-Nothing Text Document Information Retrieval Systems", VLDB Journal, 2, 1993, pp. 243-275.

Office Action for Chinese Patent Application No. 200510085371.5 (included English Translation), mailed on Jun. 17, 2010, 6 pages.

Office Action for European Application No. 05254647.0, mailed Sep. 17, 2010, 10 pages.

Office Action for European Application No. 05254646.2, mailed Sep. 17, 2010, 5 pages.

Extended European Search Report for EP Application No. 08799272.3, mailed Aug. 18, 2010, 5 pages.

Non Final Office Action received for U.S. Appl. No. 10/900,021, mailed on Jul. 16, 2007, 26 pages.

Final Office Action received for U.S. Appl. No. 10/900,021, mailed on Feb. 7, 2008, 28 pages.

Notice of Allowance received for U.S. Appl. No. 10/900,021, mailed on Oct. 20, 2008, 13 pages.

Non Final Office Action received for U.S. Appl. No. 10/900,021, mailed on Jan 17, 2007, 24 pages.

Office Action for Canadian Patent Application No. 2,513,852, mailed on Oct. 20, 2010, 4 pages.

Office Action for European Patent Application No. 05254646.2, mailed on Sep. 17, 2010, 5 pages.

Office Action for Chinese Patent Application No. 200680007173.X (with English Translation), mailed on May 21, 2010, 12 pages.

Office Action for Japanese Patent Application No. P2005-216527, mailed on Nov. 9, 2010, 12 pages.

Office Action Response for U.S. Appl. No. 12/717,687, filed Jul. 1, 2011, 14 pages.

Notice of Allowance for U.S. Appl. No. 11/851,962, mailed on Jun. 6, 2011, 14 pages.

Office Action Response for U.S. Appl. No, 12/717,663, filed Jun. 6, 2011, 18 pages.

Office Action for Canadian Patent Application No. 2,513,850, mailed on Oct. 7, 2010, 7 pages.

Extended European Search Report Response for European Patent Application No. 08799272.3, filed on Mar. 1, 2011, 12 pages.

Office Action Response for Canadian Patent Application No. 2,513,853, filed Mar. 15, 2011, 84 pages.

Office Action for Chinese Patent Application No. 200510085371.5 (with English Translation), mailed on Jan. 19, 2011, 4 pages.

Office Action Response for Chinese Patent Application No. 200510085371.5 (with English Translation), filed on Mar. 21, 2011, 3 pages.

Office Action Response for European Patent Application No. 05254647.0, filed on Jan. 27, 2011, 15 pages.

Office Action Response for European Patent Application No. 05254644.7 filed on Mar. 25, 2011, 7 pages.

Office Action for Canadian Patent Application No. 2,513,851, mailed on Mar. 14, 2011, 4 pages.

Office Action Response for Japanese Patent Application No. 2005-216530, filed on May 30, 2011, 38 pages.

Office Action Response for Japanese Patent Application No. 2005-216527, filed on May 9, 2011, 34 pages.

Office Action for Chinese Patent Application No. 200510085371.5 (with English Translation), mailed on Jan. 29, 2010, 9 pages.

Office Action Response for Japanese Patent Application No. 2005-216529, filed on May 30, 2011, 42 pages.

Office Action for CA Application No. 2,595,674, mailed Feb. 1, 2011, 2 pages.

Office Action for KR Application No. 20050068056, mailed Jul. 13, 2011, 5 pages.

Schutze, et al, "A Cooccurrence-based Thesaurus and Two Applications to Information Retrieval", Information Processing and Management, vol. 33, No. 3, 1997, pp. 307-318.

Notice of Allowance received for U.S. Appl. No. 10/900,021, mailed on Jun. 24, 2008, 7 pages.

Jones, S. et al., "Topic-Based Browsing Within a Digital Library Using Keyphrases", Proceedings of the Fourth ACM Conference on Digital Libraries, Aug. 11-14, 1999, ACM Press, pp. 114-121.

Huang, H. et al., "Gene Alert—A Sequence Search Results Keyword Parser", IEEE Engineering in Medicine and Biology Magazine, vol. 17, Issue 2, Mar.-Apr. 1998, pp. 119-122.

Fetterly, et al., "Detecting Phrase-Level Duplication on the World Wide Web", Proceedings of the 28th Annual International ACM SIGIR Conference on Research and Development in Information Retrieval (SIGIR '05), Aug. 15-19, 2005, pp. 170-177.

Ntoulas, et al., "Detecting Spam Web Pages Through Content Analysis", Proceedings of the 15th International Conference on World Wide Web 2006 (WWW 2006), May 23-26, 2006, pp. 83-92.

Examiner's First Report on Australian Patent Application No. 2005203240, mailed on Sep. 13, 2007, 2 Pages.

Examiner's First Report on Australian Patent Application No. 2005203238, mailed on Sep. 10, 2007, 2 pages.

Examiner's First Report on Australian Patent Application No. 2005203239, mailed on Sep. 13, 2007, 2 Pages.

Caropreso, M. et al., "Statistical Phrases in Automated Text Categorization", Technical Report 2000-B4-007, May 26, 2000, 18 pages.

International Search Report and Written Opinion received for PCT Patent Application No. PCT/US06/02709, mailed on Jun. 21, 2007, 9 pages.

Chang, C.T. K, et al., "Performance and Implications of Semantic Indexing in a Distributed Environment", Proceedings of the 8th International Conference on Information Knowledge Management, 1999, pp. 391-398.

Chen, H. et al., "Automatic Thesaurus Generation for an Electronic Community System", Journal of the American Society for Information Science, vol. 46 ,Issue 3, Apr. 1995, pp. 175-193.

Cheung, F. et al., "An Efficient Algorithm for Incremental Update of Concept Spaces", Proceedings of the 6th Pacific-Asia Conference on Advances in Knowledge Discovery and Data Mining, Lecture Notes In Computer Science; vol. 2336, Sep. 2002, pp. 368-380.

European Search Report received for EP Patent Application No. EP05254644.7-2201, mailed on Oct. 21, 2005, 10 pages.

European Search Report received for EP Patent Application No. EP05254645.4-2201, mailed on Sep. 21, 2005, 12 pages.

European Search Report received for EP Patent Application No. EP05254646.2-2201, mailed on Oct. 11, 2005, 11 pages.

European Search Report received for EP Patent Application No., EP05254647.0-2201, mailed on Oct. 4, 2005, 10 pages.

Gedeon, T. D., et al., "Hierarchical Co-Occurrence Relations.", IEEE International Conference on Systems, Man, and Cybernetics, vol. 3, Oct. 11-14, 1998, pp. 2750-2755.

House, D., "Save Web Time with WebSumm", Jul. 1997, 3 pages.

Jing, Y. et al., "An Association Thesaurus for Information Retrieval.", Proceedings of RIAO-94, 4th International Conference on Intelligent Multimedia Information Retrieval Systems and Management, Oct. 11-13, 1994, 15 pages.

Kando, N. "Text Structure Analysis as a Tool to Make Retrieved Documents Usable", Proceedings of the 4th International Workshop On Information Retrieval With Asian Languages, Nov. 11, 1999, 10 pages.

Leroy, G. et al., "Meeting Medical Terminology Needs—The Ontology-Enhanced Medical Concept Mapper", IEEE Transactions on Information Technology in Biomedicine, vol. 5, Issue 4, Dec. 2001, pp. 261-270.

Jones, Steve et al., "Interactive Document Summarisation Using Automatically Extracted Keyphrases", Proceedings of the 35th Annual Hawaii International Conference on System Sciences, vol. 4, 2002, pp. 1160-1169.

Lin, C. S., et al., "An Automatic Indexing and Neural Network Approach to Concept Retrieval and Classification of Multilingual (Chinese-English) Documents", IEEE Transactions on Systems, Man and Cybernetics. Part B: Cybernetics, vol. 26, No. 1, Feb. 1, 1996, pp. 75-88.

Mandala, R. et al., "Combining Multiple Evidence From Different Types of Thesaurus for Query Expansion", Proceedings of the 22nd International Conference on Research and Development in Information Retrieval, Association for Computing Machinery, Aug. 1999, pp. 191-197.

Nguyen, H. V., et al., "Mining 'Hidden Phrase' Definitions from the Web", Proceedings of the Fifth Asia-Pacific Web Conference, Apr. 2003, 11 pages.

Pretschner, A. et al., "Ontology Based Personalized Search", Proceedings of the 11th IEEE International Conference on Tools with Artificial Intelligence, Nov. 1999, pp. 391-398.

Srinivasan, P. "Optimal Document-Indexing Vocabulary for Medline.", Information Processing & Management, vol. 32(5), Sep. 1996, pp. 503-514.

Yun, Bo-Hyun et al., "Semantic-Based Information Retrieval for Content Management and Security", Computational Intelligence, vol. 19(2), May 2003, pp. 87-110.

Ahonen-Myka, Helena et al., "Finding Co-Occurring Text Phrases by Combining Sequence and Frequent Set Discovery", Proceedings of 16th International Joint Conference on Artificial Intelligence IJCAI-99 Workshop on Text Mining: Foundations Techniques and Applications, Jul. 31, 1999, 9 pages.

Chen, Hsinchun et al., "Automatic Construction of Networks of Concepts Characterizing Document Databases", IEEE Transactions on Systems, Man, and Cybernetics, vol. 22, No. 5, Sep./Oct. 1992, pp. 885-902.

Examiner's First Report received for Australian Patent Application No. 2005203237, mailed on Sep. 11, 2007, 2 pages.

Ahmed, S. et al., "Word Stemming to Enhance Spam Filtering", Proceedings of the First Conference on Email and Anti-Spam (CEAS), Jul. 30-31, 2004, 1-2 pages.

English Translation with First Office Action from the State Intellectual Property Office for Chinese Patent Application No. 200510085372.X, dated Mar. 2008, 19 pages.

English Translation with First Office Action from the State Intellectual Property Office for Chinese Patent Application No. 200510085370.0 dated Apr. 2008, 14 pages.

English Translation with First Office Action from the State Intellectual Property Office for Chinese Patent Application No. 200510085371.5, dated Apr. 2008, 10 pages.

English translation of First Office Action from the State Intellectual Property Office for Chinese Patent Application No. 200510085373.4, dated Mar. 2008, 4 pages.

Notice of Allowance received for U.S. Appl. No. 10/900,055, mailed on Dec. 12, 2007, 20 pages.

Notice of Allowance received for U.S. Appl. No. 10/900,259, mailed on Jan. 23, 2008, 16 pages.

Notice of Allowance received for U.S. Appl. No. 10/900,075, mailed on Aug. 22, 2008, 13 pages.

Notice of Allowance received for U.S. Appl. No. 10/900,012, mailed on Sep. 12, 2008, 8 pages.

International Search Report and Written Opinion received for PCT Application No. PCT/US2008/75492 mailed Nov. 18, 2008, 10 pages.

Aizawa, A "An information-theoretic perspective of tf-idf measures", Information Processing and Management: an International Journal, vol. 1, Issue 1 , 2003, pp. 45-65.

Notice of Allowance received for U.S. Appl. No. 10/900,055, mailed on Jan. 7, 2009, 13 pages.

Jagadeesh, J. et al., "Sentence Extraction Based Single Document Summarization", International Institute of Information Technology, Mar. 19-20, 2005, 5 pages.

Ahonen-Myka, Helena et al., "Finding Co-occurring text Phrases by combining sequence and frequent set discovery", 1999, 9 pages.

Jones, Steve et al., "Interactive Document Summarisation Using Automatically Extracted Keyphrases", Department of Computer Science, 2002, pp. 1-3.

Notice of Allowance received for U.S. Appl. No. 10/900,075, mailed on Feb. 20, 2009, 10 pages.

Notice of Allowance received for U.S. Appl. No. 11/043,695, mailed on Mar. 23, 2009, 8 pages.

Notice of Allowance received for U.S. Appl. No. 10/900,021, mailed Dec. 10, 2008, 10 pages.

* cited by examiner

History and Origin of the Australian Shepherd

Despite it's name, the Australian Shepherd as we know it was developed in the United States. In the late 1800's, the forrunners of today's "Aussies" came to the western and northwestern states as stock dogs for the Basque shepherds that accompanied the vast numbers of sheep being imported from Australia. These hard working, medium sized, "little blue dogs" impressed the American ranchers.

The Australian Shepherd Club of America (ASCA) was formed in 1957 to promote the breed, and several clubs kept breed registries. A unified standard was adopted in 1976, and the registries combined in 1980. (National Stock Dog Registry keeps a separate Australian Shepherd registry.) ASCA has promoted the breed with conformation, stock-dog (herding), and obedience programs, and a recently formed rescue program. An excellent book about the breed is "All About Aussies" by Jeanne Joy Hartnagle.

FIG. 3

DETECTING SPAM DOCUMENTS IN A PHRASE BASED INFORMATION RETRIEVAL SYSTEM

CROSS REFERENCE TO RELATED APPLICATIONS

This application is a continuation of U.S. patent application Ser. No. 11/478,330, filed Jun. 28, 2006, entitled "Detecting Spam Documents in a Phrase Based Information Retrieval System," now U.S. Pat. No. 7,603,345, issued on Oct. 13, 2009, which in turn is related to U.S. patent application Ser. No. 10/900,021, filed Jul. 26, 2004, entitled "Phrase Identification in an Information Retrieval System," now U.S. Pat. No. 7,580,921, issued on Aug. 25, 2009, each of which is incorporated by reference herein in its entirety.

FIELD OF THE INVENTION

The present invention relates to an information retrieval system for indexing, searching, and classifying documents in a large scale corpus, such as the Internet.

BACKGROUND OF THE INVENTION

Information retrieval systems, generally called search engines, are now an essential tool for finding information in large scale, diverse, and growing corpuses such as the Internet. Generally, search engines create an index that relates documents (or "pages") to the individual words present in each document. A document is retrieved in response to a query containing a number of query terms, typically based on having some number of query terms present in the document. The retrieved documents are then ranked according to other statistical measures, such as frequency of occurrence of the query terms, host domain, link analysis, and the like. The retrieved documents are then presented to the user, typically in their ranked order, and without any further grouping or imposed hierarchy. In some cases, a selected portion of a text of a document is presented to provide the user with a glimpse of the document's content.

Direct "Boolean" matching of query terms has well known limitations, and in particular does not identify documents that do not have the query terms, but have related words. For example, in a typical Boolean system, a search on "Australian Shepherds" would not return documents about other herding dogs such as Border Collies that do not have the exact query terms. Rather, such a system is likely to also retrieve and highly rank documents that are about Australia (and have nothing to do with dogs), and documents about "shepherds" generally.

The problem here is that conventional systems index documents based on individual terms, rather than on concepts. Concepts are often expressed in phrases, such as "Australian Shepherd," "President of the United States," or "Sundance Film Festival". At best, some prior systems will index documents with respect to a predetermined and very limited set of 'known' phrases, which are typically selected by a human operator. Indexing of phrases is typically avoided because of the perceived computational and memory requirements to identify all possible phrases of say three, four, or five or more words. For example, on the assumption that any five words could constitute a phrase, and a large corpus would have at least 200,000 unique terms, there would be approximately $3.2 \times 10^{26}$ possible phrases, clearly more than any existing system could store in memory or otherwise programmatically manipulate. A further problem is that phrases continually enter and leave the lexicon in terms of their usage, much more frequently than new individual words are invented. New phrases are always being generated, from sources such technology, arts, world events, and law. Other phrases will decline in usage over time.

Another problem that arises in existing information retrieval systems is the appearance of "spam" documents. Some spam pages are documents that have little if any meaningful content, but instead comprise collections of popular words and phrases, often hundreds or even thousands of them; these pages are sometime called "keyword stuffing pages." Others include specific words and phrases known to be of interest to advertisers. These types of documents (often called "honeypots") are created to cause search engines to retrieve such documents for display along with paid advertisements. However, to the user searching for meaningful content, retrieval of such documents results in waste of time, and frustration.

Accordingly, there is a need for an information retrieval system and methodology that can comprehensively identify phrases in a large scale corpus, index documents according to phrases. In addition, there is a need in such an information retrieval system to identify spam documents and filter such documents from search results.

SUMMARY OF THE INVENTION

An information retrieval system and methodology uses phrases to index, search, rank, and describe documents in the document collection. The system is adapted to identify phrases that have sufficiently frequent and/or distinguished usage in the document collection to indicate that they are "valid" or "good" phrases. In this manner multiple word phrases, for example phrases of four, five, or more terms, can be identified. This avoids the problem of having to identify and index every possible phrases resulting from the all of the possible sequences of a given number of words.

The system is further adapted to identify phrases that are related to each other, based on a phrase's ability to predict the presence of other phrases in a document. More specifically, a prediction measure is used that relates the actual co-occurrence rate of two phrases to an expected co-occurrence rate of the two phrases. Information gain, as the ratio of actual co-occurrence rate to expected co-occurrence rate, is one such prediction measure. Two phrases are related where the prediction measure exceeds a predetermined threshold. In that case, the second phrase has significant information gain with respect to the first phrase. Semantically, related phrases will be those that are commonly used to discuss or describe a given topic or concept, such as "President of the United States" and "White House." For a given phrase, the related phrases can be ordered according to their relevance or significance based on their respective prediction measures.

The information retrieval system is adapted to identify a spam document based on the appearance of excessive number of related phrases in the document.

The present invention has further embodiments in system and software architectures, computer program products and computer implemented methods, and computer generated user interfaces and presentations.

The foregoing are just some of the features of an information retrieval system and methodology based on phrases. Those of skill in the art of information retrieval will appreciate the flexibility of generality of the phrase information allows for a large variety of uses and applications in indexing, document annotation, searching, ranking, and other areas of document analysis and processing.

BRIEF DESCRIPTION OF THE DRAWINGS

FIG. 3 illustrates a document with a phrase window and a secondary window.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

I. System Overview

Figure 1:
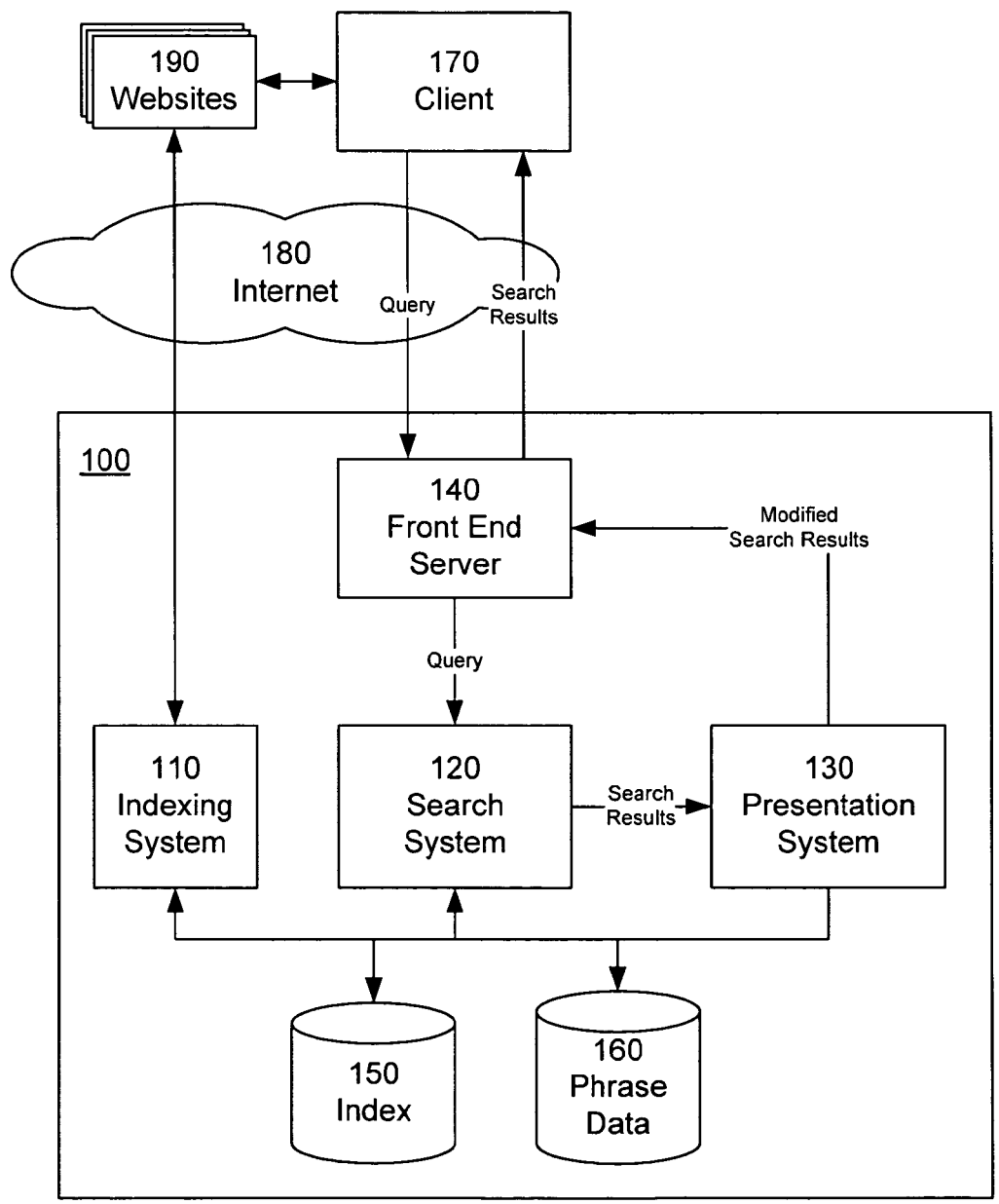
FIG. 1 is block diagram of the software architecture of one embodiment of the present invention.

Referring now to FIG. 1, there is shown the software architecture of an embodiment of a search system 100 in accordance with one embodiment of present invention. In this embodiment, the system includes an indexing system 110, a search system 120, a presentation system 130, and a front end server 140.

The indexing system 110 is responsible for identifying phrases in documents, and indexing documents according to their phrases, by accessing various websites 190 and other document collections. The front end server 140 receives queries from a user of a client 170, and provides those queries to the search system 120. The search system 120 is responsible for searching for documents relevant to the search query (search results), including identifying any phrases in the search query, and then ranking the documents in the search results using the presence of phrases to influence the ranking order. The search system 120 provides the search results to the presentation system 130. The presentation system 130 is responsible for modifying the search results including removing near duplicate documents, and generating topical descriptions of documents, and providing the modified search results back to the front end server 140, which provides the results to the client 170. The system 100 further includes a primary index 150 and a secondary index 152 that stores the indexing information pertaining to documents, and a phrase data store 160 that stores phrases, and related statistical information. The primary index 150 is distributed across a number of primary servers 1 . . . M1, and the secondary index 152 is likewise distributed across a number of secondary servers 1 . . . M2.

In the context of this application, "documents" are understood to be any type of media that can be indexed and retrieved by a search engine, including web documents, images, multimedia files, text documents, PDFs or other image formatted files, and so forth. A document may have one or more pages, partitions, segments or other components, as appropriate to its content and type. Equivalently a document may be referred to as a "page," as commonly used to refer to documents on the Internet. No limitation as to the scope of the invention is implied by the use of the generic term "documents." The search system 100 operates over a large corpus of documents, such as the Internet and World Wide Web, but can likewise be used in more limited collections, such as for the document collections of a library or private enterprises. In either context, it will be appreciated that the documents are typically distributed across many different computer systems and sites. Without loss of generality then, the documents generally, regardless of format or location (e.g., which website or database) will be collectively referred to as a corpus or document collection. Each document has an associated identifier that uniquely identifies the document; the identifier is preferably a URL, but other types of identifiers (e.g., document numbers) may be used as well. In this disclosure, the use of URLs to identify documents is assumed.

II. Indexing System

In one embodiment, the indexing system 110 provides three primary functional operations: 1) identification of phrases and related phrases, 2) indexing of documents with respect to phrases, and 3) generation and maintenance of a phrase-based taxonomy. Those of skill in the art will appreciate that the indexing system 110 will perform other functions as well in support of conventional indexing functions, and thus these other operations are not further described herein. The indexing system 110 operates on the primary index 150 and secondary index 152 and data repository 160 of phrase data. These data repositories are further described below.

1. Phrase Identification

The phrase identification operation of the indexing system 110 identifies "good" and "bad" phrases in the document collection that are useful to indexing and searching documents. In one aspect, good phrases are phrases that tend to occur in more than certain percentage of documents in the document collection, and/or are indicated as having a distinguished appearance in such documents, such as delimited by markup tags or other morphological, format, or grammatical markers. Another aspect of good phrases is that they are predictive of other good phrases, and are not merely sequences of words that appear in the lexicon. For example, the phrase "President of the United States" is a phrase that predicts other phrases such as "George Bush" and "Bill Clinton." However, other phrases are not predictive, such as "fell down the stairs" or "top of the morning," "out of the blue," since idioms and colloquisms like these tend to appear with many other different and unrelated phrases. Thus, the phrase identification phase determines which phrases are good phrases and which are bad (i.e., lacking in predictive power).

Figure 2:
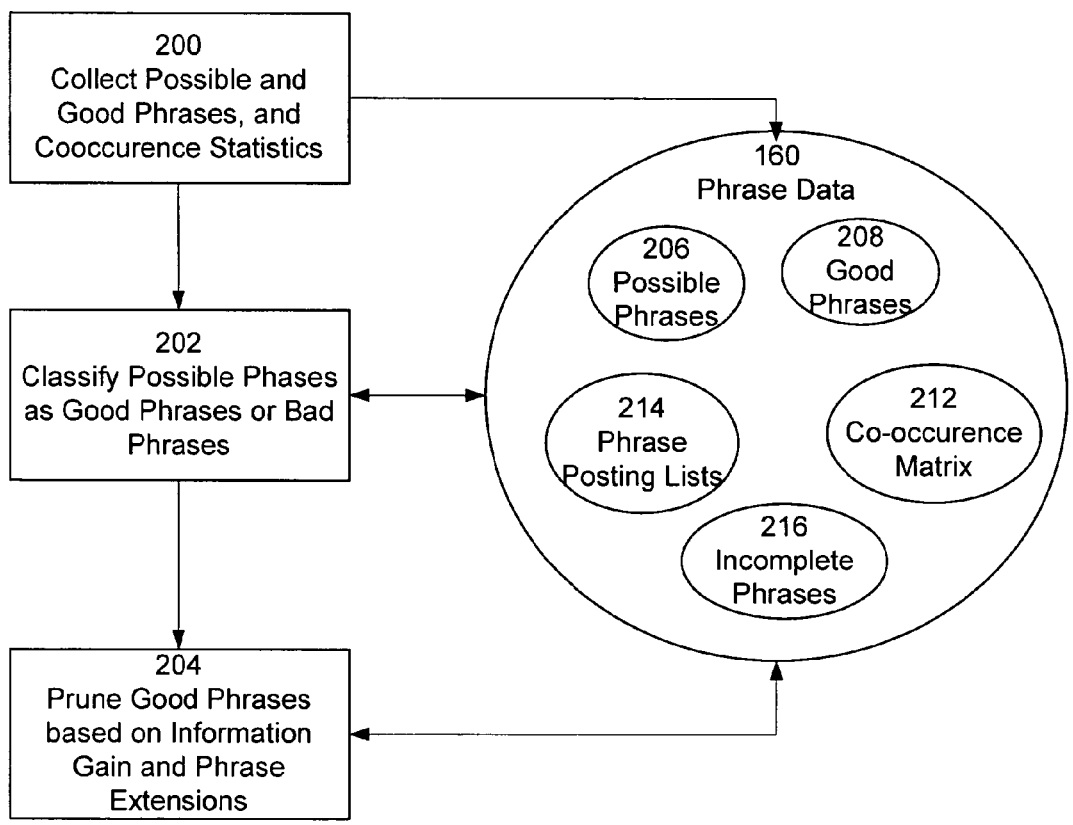
FIG. 2 illustrates a method of identifying phrases in documents.

Referring to now FIG. 2, the phrase identification process has the following functional stages:

200: Collect possible and good phrases, along with frequency and co-occurrence statistics of the phrases.

202: Classify possible phrases to either good or bad phrases based on frequency statistics.

204: Prune good phrase list based on a predictive measure derived from the co-occurrence statistics.

Each of these stages will now be described in further detail.

The first stage 200 is a process by which the indexing system 110 crawls a set of documents in the document collection, making repeated partitions of the document collection over time. One partition is processed per pass. The number of documents crawled per pass can vary, and is preferably about 1,000,000 per partition. It is preferred that only previously uncrawled documents are processed in each partition, until all documents have been processed, or some other termination criteria is met. In practice, the crawling continues as new documents are being continually added to the document collection. The following steps are taken by the indexing system 110 for each document that is crawled.

Traverse the words of the document with a phrase window length of n, where n is a desired maximum phrase length. The length of the window will typically be at least 2, and preferably 4 or 5 terms (words). Preferably phrases include all words in the phrase window, including what would otherwise be characterized as stop words, such as "a", "the," and so forth. A phrase window may be terminated by an end of line, a paragraph return, a markup tag, or other indicia of a change in content or format.

FIG. 3 illustrates a portion of a document 300 during a traversal, showing the phrase window 302 starting at the word "stock" and extending 5 words to the right. The first word in the window 302 is candidate phrase i, and the each of the sequences i+1, i+2, i+3, 1+4, and i+5 is likewise a candidate phrase. Thus, in this example, the candidate phrases are: "stock", "stock dogs", "stock dogs for", "stock dogs for the", "stock dogs for the Basque", and "stock dogs for the Basque shepherds".

In each phrase window 302, each candidate phrase is checked in turn to determine if it is already present in the good phrase list 208 or the possible phrase list 206. If the candidate phrase is not present in either the good phrase list 208 or the possible phrase list 206, then the candidate has already been determined to be "bad" and is skipped.

If the candidate phrase is in the good phrase list 208, as entry $g_j$, then the index 150 entry for phrase $g_j$ is updated to include the document (e.g., its URL or other document identifier), to indicate that this candidate phrase $g_j$ appears in the current document. An entry in the index 150 for a phrase $g_j$ (or a term) is referred to as the posting list of the phrase $g_j$. The posting list includes a list of documents d (by their document identifiers, e.g. a document number, or alternatively a URL) in which the phrase occurs. In one embodiment, the document number is derived by a one-way hash of the URL, using, for example, MD5.

In addition, the co-occurrence matrix 212 is updated, as further explained below. In the very first pass, the good and bad lists will be empty, and thus, most phrases will tend to be added to the possible phrase list 206.

If the candidate phrase is not in the good phrase list 208 then it is added to the possible phrase list 206, unless it is already present therein. Each entry p on the possible phrase list 206 has three associated counts:

P(p): Number of documents on which the possible phrase appears;

S(p): Number of all instances of the possible phrase; and

M(p): Number of interesting instances of the possible phrase. An instance of a possible phrase is "interesting" where the possible phrase is distinguished from neighboring content in the document by grammatical or format markers, for example by being in boldface, or underline, or as anchor text in a hyperlink, or in quotation marks. These (and other) distinguishing appearances are indicated by various HTML markup language tags and grammatical markers. These statistics are maintained for a phrase when it is placed on the good phrase list 208.

In addition the various lists, a co-occurrence matrix 212 (G) for the good phrases is maintained. The matrix G has a dimension of m×m, where m is the number of good phrases. Each entry G(j, k) in the matrix represents a pair of good phrases ($g_j$, $g_k$). The co-occurrence matrix 212 logically (though not necessarily physically) maintains three separate counts for each pair ($g_j$, $g_k$) of good phrases with respect to a secondary window 304 that is centered at the current word i, and extends +/−h words. In one embodiment, such as illustrated in FIG. 3, the secondary window 304 is 30 words. The co-occurrence matrix 212 thus maintains:

R(j,k): Raw Co-occurrence count. The number of times that phrase $g_j$ appears in a secondary window 304 with phrase $g_k$;

D(j,k): Disjunctive Interesting count. The number of times that either phrase $g_j$ or phrase $g_k$ appears as distinguished text in a secondary window; and C(j,k): Conjunctive Interesting count: the number of times that both $g_j$ and phrase $g_k$ appear as distinguished text in a secondary window. The use of the conjunctive interesting count is particularly beneficial to avoid the circumstance where a phrase (e.g., a copyright notice) appears frequently in sidebars, footers, or headers, and thus is not actually predictive of other text.

Referring to the example of FIG. 3, assume that the "stock dogs" is on the good phrase list 208, as well as the phrases "Australian Shepherd" and "Australian Shepard Club of America". Both of these latter phrases appear within the secondary window 304 around the current phrase "stock dogs". However, the phrase "Australian Shepherd Club of America" appears as anchor text for a hyperlink (indicated by the underline) to website. Thus the raw co-occurrence count for the pair {"stock dogs", "Australian Shepherd"} is incremented, and the raw occurrence count and the disjunctive interesting count for {"stock dogs", "Australian Shepherd Club of America"} are both incremented because the latter appears as distinguished text.

The process of traversing each document with both the sequence window 302 and the secondary window 304, is repeated for each document in the partition.

Once the documents in the partition have been traversed, the next stage of the indexing operation is to update 202 the good phrase list 208 from the possible phrase list 206. A possible phrase p on the possible phrase list 206 is moved to the good phrase list 208 if the frequency of appearance of the phrase and the number of documents that the phrase appears in indicates that it has sufficient usage as semantically meaningful phrase.

In one embodiment, this is tested as follows. A possible phrase p is removed from the possible phrase list 206 and placed on the good phrase list 208 if:

a) P(p)>10 and S(p)>20 (the number of documents containing phrase p is more than 10, and the number of occurrences of phrase p is more then 20); or b) M(p)>5 (the number of interesting instances of phrase p is more than 5).

These thresholds are scaled by the number of documents in the partition; for example if 2,000,000 documents are crawled in a partition, then the thresholds are approximately doubled. Of course, those of skill in the art will appreciate that the specific values of the thresholds, or the logic of testing them, can be varied as desired.

If a phrase p does not qualify for the good phrase list 208, then it is checked for qualification for being a bad phrase. A phrase p is a bad phrase if:

a) number of documents containing phrase, P(p)<2; and b) number of interesting instances of phrase, M(p)=0.

These conditions indicate that the phrase is both infrequent, and not used as indicative of significant content and again these thresholds may be scaled per number of documents in the partition.

It should be noted that the good phrase list 208 will naturally include individual words as phrases, in addition to multi-word phrases, as described above. This is because each the first word in the phrase window 302 is always a candidate phrase, and the appropriate instance counts will be accumulated. Thus, the indexing system 110 can automatically index both individual words (i.e., phrases with a single word) and multiple word phrases. The good phrase list 208 will also be considerably shorter than the theoretical maximum based on all possible combinations of m phrases. In typical embodiment, the good phrase list 208 will include about $6.5 \times 10^5$ phrases. A list of bad phrases is not necessary to store, as the system need only keep track of possible and good phrases.

By the final pass through the document collection, the list of possible phrases will be relatively short, due to the expected distribution of the use of phrases in a large corpus. Thus, if say by the 10th pass (e.g., 10,000,000 documents), a phrase appears for the very first time, it is very unlikely to be a good phrase at that time. It may be new phrase just coming into usage, and thus during subsequent crawls becomes increasingly common. In that case, its respective counts will increases and may ultimately satisfy the thresholds for being a good phrase.

The third stage of the indexing operation is to prune 204 the good phrase list 208 using a predictive measure derived from the co-occurrence matrix 212. Without pruning, the good phrase list 208 is likely to include many phrases that while legitimately appearing in the lexicon, themselves do not sufficiently predict the presence of other phrases, or themselves are subsequences of longer phrases. Removing these weak good phrases results in a very robust likely of good phrases. To identify good phrases, a predictive measure is used which expresses the increased likelihood of one phrase appearing in a document given the presence of another phrase. This is done, in one embodiment, as follows:

As noted above, the co-occurrence matrix 212 is an m×m matrix of storing data associated with the good phrases. Each row j in the matrix represents a good phrase $g_j$ and each column k represented a good phrase $g_k$. For each good phrase $g_j$, an expected value $E(g_j)$ is computed. The expected value E is the percentage of documents in the collection expected to contain $g_j$. This is computed, for example, as the ratio of the number of documents containing $g_j$ to the total number T of documents in the collection that have been crawled: P(j)/T.

As noted above, the number of documents containing $g_j$ is updated each time $g_j$ appears in a document. The value for $E(g_j)$ can be updated each time the counts for $g_j$ are incremented, or during this third stage.

Next, for each other good phrase $g_k$ (e.g., the columns of the matrix), it is determined whether $g_j$ predicts $g_k$. A predictive measure for $g_j$ is determined as follows:

i) compute the expected value $E(g_k)$. The expected co-occurrence rate E(j,k) of $g_j$ and $g_k$, if they were unrelated phrases is then $E(g_j)*E(g_k)$;

ii) compute the actual co-occurrence rate A(j,k) of $g_j$ and $g_k$. This is the raw co-occurrence count R(j, k) divided by T, the total number of documents;

iii) $g_j$ is said to predict $g_k$ where the actual co-occurrence rate A(j,k) exceeds the expected co-occurrence rate E(j,k) by a threshold amount.

In one embodiment, the predictive measure is information gain. Thus, a phrase $g_j$ predicts another phrase $g_k$ when the information gain I of $g_k$ in the presence of $g_j$ exceeds a threshold. In one embodiment, this is computed as follows:

$$I(j,k)=A(j,k)/E(j,k)$$

And good phrase $g_j$ predicts good phrase $g_k$ where: I(j,k)>Information Gain threshold.

In one embodiment, the information gain threshold is 1.5, but is preferably between 1.1 and 1.7. Raising the threshold over 1.0 serves to reduce the possibility that two otherwise unrelated phrases co-occur more than randomly predicted.

As noted the computation of information gain is repeated for each column k of the matrix G with respect to a given row j. Once a row is complete, if the information gain for none of the good phrases $g_k$ exceeds the information gain threshold, then this means that phrase $g_j$ does not predict any other good phrase. In that case, $g_j$ is removed from the good phrase list 208, essentially becoming a bad phrase. Note that the column j for the phrase $g_j$ is not removed, as this phrase itself may be predicted by other good phrases.

This step is concluded when all rows of the co-occurrence matrix 212 have been evaluated.

The final step of this stage is to prune the good phrase list 208 to remove incomplete phrases. An incomplete phrase is a phrase that only predicts its phrase extensions, and which starts at the left most side of the phrase (i.e., the beginning of the phrase). The "phrase extension" of phrase p is a super-sequence that begins with phrase p. For example, the phrase "President of" predicts "President of the United States", "President of Mexico", "President of AT&T", etc. All of these latter phrases are phrase extensions of the phrase "President of" since they begin with "President of" and are super-sequences thereof.

Accordingly, each phrase $g_j$ remaining on the good phrase list 208 will predict some number of other phrases, based on the information gain threshold previously discussed. Now, for each phrase $g_j$ the indexing system 110 performs a string match with each of the phrases $g_k$ that is predicts. The string match tests whether each predicted phrase $g_k$ is a phrase extension of the phrase $g_j$. If all of the predicted phrases $g_k$ are phrase extensions of phrase $g_j$, then phrase $g_j$ is incomplete, and is removed from the good phrase list 208, and added to an incomplete phrase list 216. Thus, if there is at least one phrase $g_k$ that is not an extension of $g_j$, then $g_j$ is complete, and maintained in the good phrase list 208. For example then, "President of the United" is an incomplete phrase because the only other phrase that it predicts is "President of the United States" which is an extension of the phrase.

The incomplete phrase list 216 itself is very useful during actual searching. When a search query is received, it can be compared against the incomplete phase list 216. If the query (or a portion thereof) matches an entry in the list, then the search system 120 can lookup the most likely phrase extensions of the incomplete phrase (the phrase extension having the highest information gain given the incomplete phrase), and suggest this phrase extension to the user, or automatically search on the phrase extension. For example, if the search query is "President of the United," the search system 120 can automatically suggest to the user "President of the United States" as the search query.

After the last stage of the indexing process is completed, the good phrase list 208 will contain a large number of good phrases that have been discovered in the corpus. Each of these good phrases will predict at least one other phrase that is not a phrase extension of it. That is, each good phrase is used with sufficient frequency and independence to represent meaningful concepts or ideas expressed in the corpus. Unlike existing systems which use predetermined or hand selected phrases, the good phrase list reflects phrases that actual are being used in the corpus. Further, since the above process of crawling and indexing is repeated periodically as new documents are added to the document collection, the indexing system 110 automatically detects new phrases as they enter the lexicon.

2. Identification of Related Phrases and Clusters of Related Phrases

Figure 4:
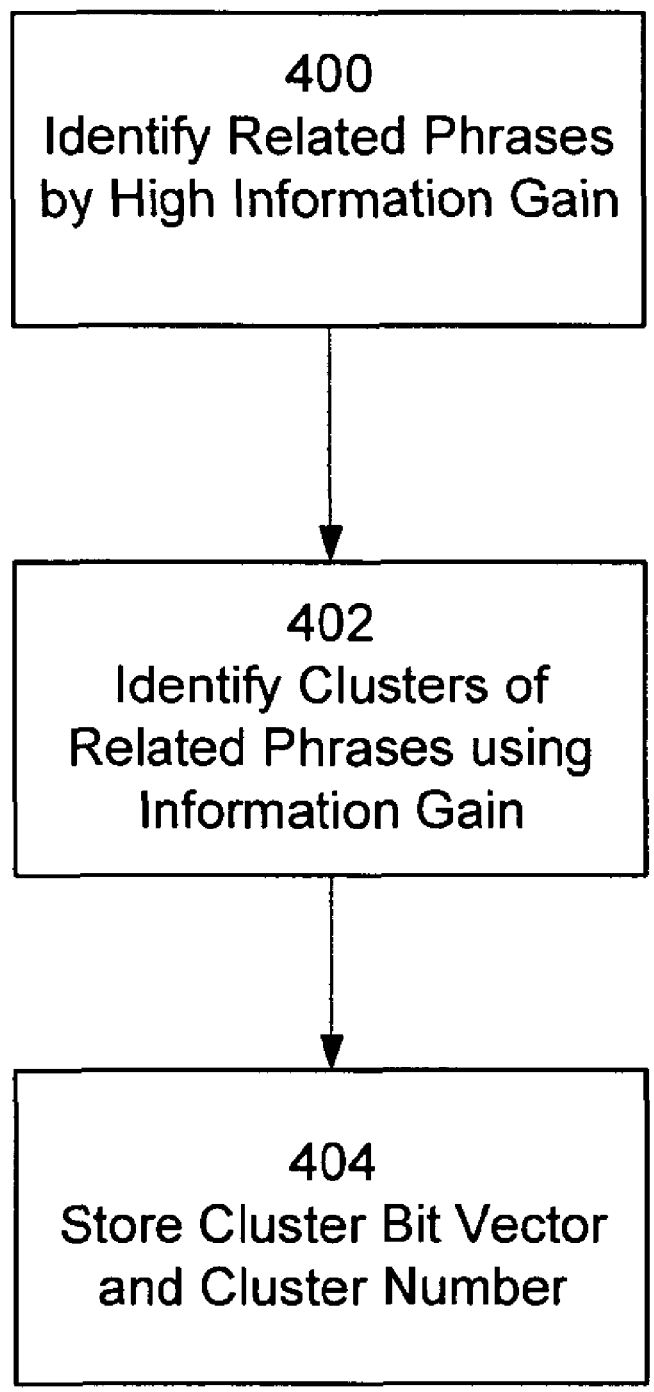
FIG. 4 illustrates a method of identifying related phrases.

Referring to FIG. 4, the related phrase identification process includes the following functional operations.

400: Identify related phrases having a high information gain value.

402: Identify clusters of related phrases.
404: Store cluster bit vector and cluster number.

Each of these operations is now described in detail.

First, recall that the co-occurrence matrix 212 contains good phrases $g_j$, each of which predicts at least one other good phrase $g_k$ with an information gain greater than the information gain threshold. To identify 400 related phrases then, for each pair of good phrases $(g_j, g_k)$ the information gain is compared with a Related Phrase threshold, e.g., 100. That is, $g_j$ and $g_k$ are related phrases where:

$$I(g_j, g_k) > 100.$$

This high threshold is used to identify the co-occurrences of good phrases that are well beyond the statistically expected rates. Statistically, it means that phrases $g_j$ and $g_k$ co-occur 100 times more than the expected co-occurrence rate. For example, given the phrase "Monica Lewinsky" in a document, the phrase "Bill Clinton" is a 100 times more likely to appear in the same document, then the phrase "Bill Clinton" is likely to appear on any randomly selected document. Another way of saying this is that the accuracy of the predication is 99.999% because the occurrence rate is 100:1.

Accordingly, any entry $(g_j, g_k)$ that is less the Related Phrase threshold is zeroed out, indicating that the phrases $g_j$, $g_k$ are not related. Any remaining entries in the co-occurrence matrix 212 now indicate all related phrases.

The columns $g_k$ in each row $g_j$ of the co-occurrence matrix 212 are then sorted by the information gain values $I(g_j, g_k)$, so that the related phrase $g_k$ with the highest information gain is listed first. This sorting thus identifies for a given phrase $g_j$, which other phrases are most likely related in terms of information gain.

The next step is to determine 402 which related phrases together form a cluster of related phrases. A cluster is a set of related phrases in which each phrase has high information gain with respect to at least one other phrase. In one embodiment, clusters are identified as follows.

In each row $g_j$ of the matrix, there will be one or more other phrases that are related to phrase $g_j$. This set is related phrase set $R_j$, where $R = \{g_k, g_l, \ldots g_m\}$.

For each related phrase m in $R_j$, the indexing system 110 determines if each of the other related phrases in R is also related to $g_j$. Thus, if $I(g_k, g_l)$ is also non-zero, then $g_j$, $g_k$, and $g_l$ are part of a cluster. This cluster test is repeated for each pair $(g_l, g_m)$ in R.

For example, assume the good phrase "Bill Clinton" is related to the phrases "President", "Monica Lewinsky", because the information gain of each of these phrases with respect to "Bill Clinton" exceeds the Related Phrase threshold. Further assume that the phrase "Monica Lewinsky" is related to the phrase "purse designer". These phrases then form the set R. To determine the clusters, the indexing system 110 evaluates the information gain of each of these phrases to the others by determining their corresponding information gains. Thus, the indexing system 110 determines the information gain I("President", "Monica Lewinsky"), I("President", "purse designer"), and so forth, for all pairs in R. In this example, "Bill Clinton," "President", and "Monica Lewinsky" form a one cluster, "Bill Clinton," and "President" form a second cluster, and "Monica Lewinsky" and "purse designer" form a third cluster, and "Monica Lewinsky", "Bill Clinton," and "purse designer" form a fourth cluster. This is because while "Bill Clinton" does not predict "purse designer" with sufficient information gain, "Monica Lewinsky" does predict both of these phrases.

To record 404 the cluster information, each cluster is assigned a unique cluster number (cluster ID). This information is then recorded in conjunction with each good phrase $g_j$.

In one embodiment, the cluster number is determined by a cluster bit vector that also indicates the orthogonality relationships between the phrases. The cluster bit vector is a sequence of bits of length n, the number of good phrases in the good phrase list 208. For a given good phrase $g_j$, the bit positions correspond to the sorted related phrases R of $g_j$. A bit is set if the related phrase $g_k$ in R is in the same cluster as phrase $g_j$. More generally, this means that the corresponding bit in the cluster bit vector is set if there is information gain in either direction between $g_j$ and $g_k$.

The cluster number then is the value of the bit string that results. This implementation has the property that related phrases that have multiple or one-way information gain appear in the same cluster.

An example of the cluster bit vectors are as follows, using the above phrases:

|  | Bill Clinton | President | Monica Lewinsky | purse designer | Cluster ID |
|---|---|---|---|---|---|
| Bill Clinton | 1 | 1 | 1 | 0 | 14 |
| President | 1 | 1 | 0 | 0 | 12 |
| Monica Lewinsky | 1 | 0 | 1 | 1 | 11 |
| purse designer | 0 | 0 | 1 | 1 | 3 |

To summarize then, after this process there will be identified for each good phrase $g_j$, a set of related phrases R, which are sorted in order of information gain $I(g_j, g_k)$ from highest to lowest. In addition, for each good phrase there will be a cluster bit vector, the value of which is a cluster number identifying the primary cluster of which the phrase $g_j$ is a member, and the orthogonality values (1 or 0 for each bit position) indicating which of the related phrases in R are in common clusters with Thus in the above example, "Bill Clinton", "President", and "Monica Lewinsky" are in cluster 14 based on the values of the bits in the row for phrase "Bill Clinton".

To store this information, two basic representations are available. First, as indicated above, the information may be stored in the co-occurrence matrix 212, wherein:

entry G[row j, col. k]=(I(j,k), clusterNumber, clusterBitVector)

Alternatively, the matrix representation can be avoided, and all information stored in the good phrase list 208, wherein each row therein represents a good phrase Phrase row$_j$=list [phrase $g_k$, (I(j,k), clusterNumber, clusterBitVector)].

This approach provides a useful organization for clusters. First, rather than a strictly—and often arbitrarily—defined hierarchy of topics and concepts, this approach recognizes that topics, as indicated by related phrases, form a complex graph of relationships, where some phrases are related to many other phrases, and some phrases have a more limited scope, and where the relationships can be mutual (each phrase predicts the other phrase) or one-directional (one phrase predicts the other, but not vice versa). The result is that clusters can be characterized "local" to each good phrase, and some clusters will then overlap by having one or more common related phrases.

For a given good phrase $g_j$ then the ordering of the related phrases by information gain provides a taxonomy for naming the clusters of the phrase: the cluster name is the name of the related phrase in the cluster having the highest information gain.

The above process provides a very robust way of identifying significant phrases that appear in the document collection, and beneficially, the way these related phrases are used together in natural "clusters" in actual practice. As a result, this data-driven clustering of related phrases avoids the biases that are inherent in any manually directed "editorial" selection of related terms and concepts, as is common in many systems.

3. Indexing Documents with Phrases and Related Phrases

Figure 5:
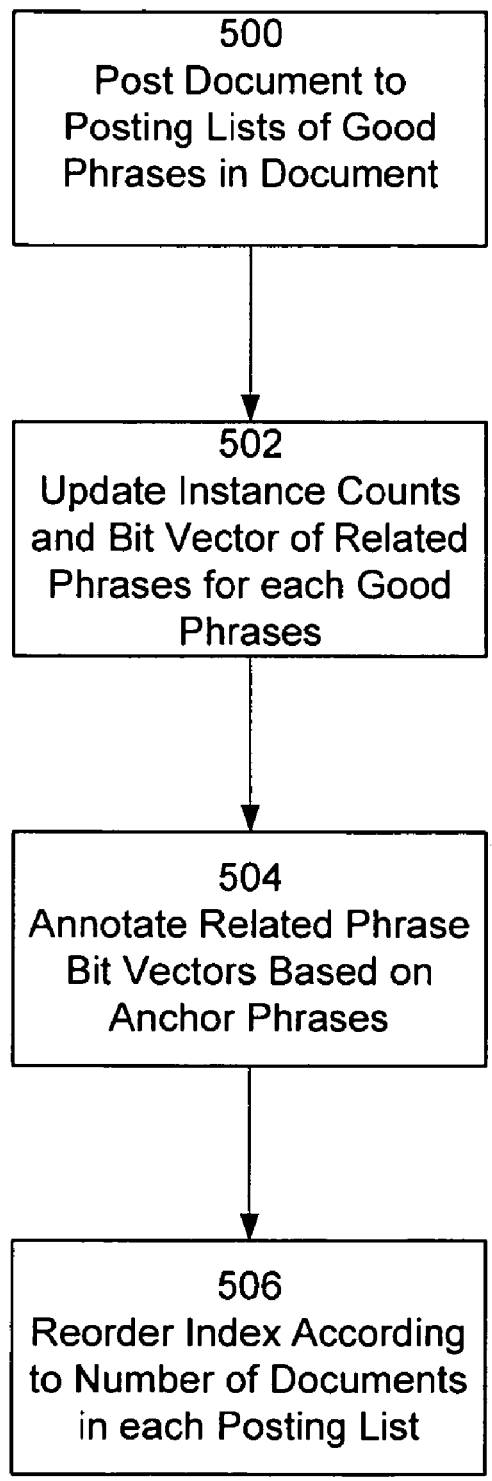
FIG. 5 illustrates a method of indexing documents for related phrases.

Given the good phrase list 208, including the information pertaining to related phrases and clusters, the next functional operation of the indexing system 110 is to index documents in the document collection with respect to the good phrases and clusters, and store the updated information in the primary index 150 and the secondary index 152. FIG. 5 illustrates this process, in which there are the following functional stages for indexing a document:

500: Post document to the posting lists of good phrases found in the document.

502: Update instance counts and related phrase bit vector for related phases and secondary related phrases.

504: Reorder index entries according to posting list size.

506: Rank index entries in each posting list by an information retrieval score or feature value.

508: Partition each posting list between the primary server 150 and a secondary server 152.

These stages are now described in further detail.

A set of documents is traversed or crawled, as before; this may be the same or a different set of documents. For a given document d, traverse 500 the document word by word with a sequence window 302 of length n, from position i, in the manner described above.

In a given phrase window 302, identify all good phrases in the window, starting at position i. Each good phrase is denoted as $g_i$. Thus, g1 is the first good phrase, g2 would be the second good phrase, and so forth.

For each good phrase $g_i$ (example g1 "President" and g4 "President of ATT") post the document identifier (e.g., the URL) to the posting list for the good phrase $g_i$ in the index 150. This update identifies that the good phrase $g_i$ appears in this specific document.

In one embodiment, the posting list for a phrase $g_j$ takes the following logical form:

Phrase $g_j$: list: (document d, [list: related phase counts] [related phrase information])

For each phrase $g_j$ there is a list of the documents d on which the phrase appears. For each document, there is a list of counts of the number of occurrences of the related phrases R of phrase $g_j$ that also appear in document d.

In one embodiment, the related phrase information is a related phase bit vector. This bit vector may be characterized as a "bi-bit" vector, in that for each related phrase $g_k$ there are two bit positions, $g_k$-1, $g_k$-2. The first bit position stores a flag indicating whether the related phrase $g_k$ is present in the document d (i.e., the count for $g_k$ in document d is greater than 0). The second bit position stores a flag that indicates whether a related phrase $g_l$ of $g_k$ is also present in document d. The related phrases $g_l$ of a related phrase $g_k$ of a phrase $g_j$ are herein called the "secondary related phrases of $g_j$". The counts and bit positions correspond to the canonical order of the phrases in R (sorted in order of decreasing information gain). This sort order has the effect of making the related phrase $g_k$ that is most highly predicted by $g_j$ associated with the most significant bit of the related phrase bit vector, and the related phrase $g_l$ that is least predicted by $g_j$ associated with the least significant bit.

It is useful to note that for a given phrase g, the length of the related phrase bit vector, and the association of the related phrases to the individual bits of the vector, will be the same with respect to all documents containing g. This implementation has the property of allowing the system to readily compare the related phrase bit vectors for any (or all) documents containing g, to see which documents have a given related phrase. This is beneficial for facilitating the search process to identify documents in response to a search query. Accordingly, a given document will appear in the posting lists of many different phrases, and in each such posting list, the related phrase vector for that document will be specific to the phrase that owns the posting list. This aspect preserves the locality of the related phrase bit vectors with respect to individual phrases and documents.

Accordingly, the next stage 502 includes traversing the secondary window 304 of the current index position in the document (as before a secondary window of +/−K terms, for example, 30 terms), for example from i−K to i+K. For each related phrase $g_k$ of $g_i$ that appears in the secondary window 304, the indexing system 110 increments the count of $g_k$ with respect to document d in the related phrase count. If $g_i$ appears later in the document, and the related phrase is found again within the later secondary window, again the count is incremented.

As noted, the corresponding first bit $g_k$-1 in the related phrase bit map is set based on the count, with the bit set to 1 if the count for $g_k$ is >0, or set to 0 if the count equals 0.

Next, the second bit, $g_k$-2 is set by looking up related phrase $g_k$ in the index 150, identifying in $g_k$'s posting list the entry for document d, and then checking the secondary related phrase counts (or bits) for $g_k$ for any its related phrases. If any of these secondary related phrases counts/bits are set, then this indicates that the secondary related phrases of $g_j$ are also present in document d.

When document d has been completely processed in this manner, the indexing system 110 will have identified the following:

i) each good phrase $g_j$ in document d;

for each good phrase $g_j$ which of its related phrases $g_k$ are present in document d;

for each related phrase $g_k$ present in document d, which of its related phrases $g_l$ (the secondary related phrases of $g_j$) are also present in document d.

a) Partitioned Indexing

Each phrase in the index 150 is given a phrase number, based on its frequency of occurrence in the corpus. The more common the phrase, the lower phrase number it receives in the index. The indexing system 110 then sorts 504 all of the posting lists 214 in the primary index 150 in declining order according to the number of documents listed in each posting list, so that the most frequently occurring phrases have the lowest phrase number and are listed first in the primary index 150. As noted above, the primary index 150 is distributed across M1 primary servers. To reduce disk contention, phrases are distributed across these machines by hash function, e.g., phase_number MOD M1.

To significantly increase the number of documents that can be indexed by the system, the primary index 150 is further processed to selectively partition each of the posting lists 214. As noted above, the posting list of each phrase contains a list of documents. Each document in the posting list is given 506 an information retrieval-type score with respect to the phrase. However the score is computed, the documents in the posting list are then ranked in declining order by this score, with the highest scoring documents listed first in the posting list. This pre-ranking of documents is particularly beneficial for improved performance when retrieving documents in response to a search query.

The scoring algorithm for pre-ranking the documents may be the same underlying relevance scoring algorithm used in the search system 120 to generate a relevance score. In one embodiment, the IR score is based on the page rank algorithm, as described in U.S. Pat. No. 6,285,999. Alternatively or additionally, statistics for a number of IR-relevant attributes of the document, such as the number of inlinks, outlinks, document length, may also be stored, and used alone or in combination in order to rank the documents. For example, the documents may be ranked in declining order according to the number of inlinks. To further facilitate the fastest possible retrieval of information from the primary index 150, the entries in each posting list 214 are physically stored on the appropriate primary server in the rank ordering by the IR-type score.

Given that the highest scoring documents for a given phrase are now at the beginning of the posting list, the posting list 214 is partitioned 508 between the primary index 150 and the secondary index 152. The posting list entries for up to the first K documents remain stored on the primary server 150, while the posting list entries for the remaining n>K documents are stored in the secondary index 152, and deleted from the end of the posting list 214 in the primary index 150. In one embodiment K is set to 32,768 (32 k), but a higher or lower value of K may be used. A phrase that has its posting list partitioned between the primary and the secondary index is called a 'common' phrase, whereas a phrase that is not partitioned is called a 'rare' phrase. The portion of a posting list stored in the primary index 150 is referred to as the primary posting list, and contains the primary entries, and portion of a posting list stored in the secondary index 152 is referred to as the secondary posting list and contains the secondary entries. The secondary entries for a given posting list 214 are assigned to a secondary server according to another hash function of the phrase number, e.g., phrase number MOD M2. The secondary server ID is stored in the posting list on the primary server, to allow the search system 120 to readily access the appropriate secondary server as needed. For each phrase posting list stored on one of the secondary servers, the secondary entries are stored physically in order of their document numbers, from lowest document number to highest (in contrast to the relevance ordering in the primary index 150). Preferably, no relevance information is stored in the secondary entries, so that the entries contain a minimal amount of data, such as the document number, and document locator (e.g., URL). The ranking and partitioning steps may be performed sequentially for each phrase; alternatively all (or a number of) phrases can first be ranked, and then partitioned; the algorithm design is merely a design choice and the above variations are considered equivalents. The ranking and partitioning steps are conducted during each indexing pass over a set of documents, so that any phrases that are updated with new documents during an indexing pass are re-ranked and re-partitioned. Other optimizations and operations are also possible.

In one embodiment, the selection of document attributes that are stored in the primary index 150 for each document in the post listing 214 is variable, and in particular decreases towards the end of the posting list 214 in the primary index. In other words, documents that are highly ranked in the posting list based on their relevance score (or other relevance based attributes), will have all or most of the document attributes stored in the document entry in the posting list. Documents at near the end of the posting list 214 in the primary index will have only a more limited set of such attributes stored.

In one embodiment, each posting list 214 in the primary index 150 has three sections (or tiers), of lengths m, 3 m, 5 m, where m here is a number of document entries, In this embodiment, it is desirable that each section have length K, as described above, that is m=K, and the entire primary index has 9K entries; the secondary index would then store the secondary entries where n>9K.

In the first section (first m entries), the following relevance attributes are stored for each document entry in the posting list of a given phrase:
1. The document relevance score (e.g., page rank);
2. Total number of occurrences of the phrase in the document;
3. A rank ordered list of up to 10,000 anchor documents that also contain the phrase and which point to this document, and for each anchor document its relevance score (e.g., page rank), and the anchor text itself; and
4. The position of each phrase occurrence, and for each occurrence, a set of flags indicating whether the occurrence is a title, bold, a heading, in a URL, in the body, in a sidebar, in a footer, in an advertisement, capitalized, or in some other type of HTML markup.

In the second section (next 3 m entries), only items 1-3 are stored.

In the third section (final 5 m entries), only item 1 is stored.

Systematically reducing which document attributes are stored in later portions of each posting list 214 is acceptable because document near the end of the posting list are already determined to be less relevant to the particular phrase (lower relevance score), and so it is not entirely necessary to store all of their relevance characteristics.

Systematically reducing which document attributes are stored in later portions of each posting list 214 is acceptable because documents at near the end of the posting list are already determined to be less relevant to the particular phrase (lower relevance score), and so it is not entirely necessary to store all of their relevance characteristics.

The foregoing storage arrangement enables storing significantly more entries in a given amount of hard disk storage than conventional techniques. First, elimination of the term position information for every phrase in every document provides approximately a 50% reduction in the amount of storage needed for a given set of documents, thereby effectively doubling the number of documents that can be stored. Second, partitioning the posting lists between the primary index and secondary indices and storing relevance information only in the primary index provides further substantial savings. Many phrases have over 100,000, even 1,000,000 documents in their posting lists. Storing the relevance information for only a limited number of entries in the primary index eliminates the storage needed for the documents that are not likely to be returned in search. This aspect provides approximately a ten-fold increase in the number of documents that can be stored. Finally, further savings (approximately 25%-50% reduction in required storage capacity) are achieved by selectively storing less relevance information in the primary index 150 for the less relevant (lower ranked) documents in each posting list 214.

b) Determining the Topics for a Document

The indexing of documents by phrases and use of the clustering information provides yet another advantage of the indexing system 110, which is the ability to determine the topics that a document is about based on the related phrase information.

Assume that for a given good phrase $g_j$ and a given document d, the posting list entry is as follows:

$g_j$: document d: related phrase counts:={3,4,3,0,0,2,1,1,0}
related phrase bit vector:={11 11 10 00 00 10 10 10 01}
where, the related phrase bit vector is shown in the bi-bit pairs.

From the related phrase bit vector, we can determine primary and secondary topics for the document d. A primary topic is indicated by a bit pair (1,1), and a secondary topic is indicated by a bit pair (1,0). A related phrase bit pair of (1,1) indicates that both the related phrase $g_k$ for the bit pair is present in document d, along the secondary related phrases $g_l$ as well. This may be interpreted to mean that the author of the document d used several related phrases $g_j$, $g_k$, and $g_l$ together in drafting the document. A bit pair of (1,0) indicates that both $g_j$ and $g_k$ are present, but no further secondary related phrases from $g_k$ are present, and thus this is a less significant topic.

c) Indexing Instances of Documents for Archival Retrieval

Another embodiment of the present invention allows the capability to store and maintain historical documents in the indices, and thereby enable archival retrieval of date specific instances (versions) of individual documents or pages. This capability has various beneficial uses, including enabling a user to search for documents within a specific range of dates, enabling the search system 120 to use date or version related relevance information in evaluating documents in response to a search query, and in organizing search results.

Another embodiment of the present invention allows the capability to store and maintain historical documents in the indices, and thereby enable archival retrieval of date specific instances (versions) of individual documents or pages. This capability has various beneficial uses, including enabling a user may search for documents within a specific range of dates, enabling the search system 120 to use date or version related relevance information in evaluating documents in response to a search query, and in organizing search results.

In this embodiment, the document identifier encodes the identity of the document with respect to a date interval. The first time a document is crawled by the indexing system 110, the document identifier is stored as a hash of the document URL and the date stamp of the document, for example, MD5 (URL, first date). Associated with the particular instance of the document is date range field, which comprises a range of dates for which the document instance is deemed to valid. The date range can be specified as a date pair comprising a first date on which the document is deemed valid (the indexing date) and a last date on which the document is deemed valid (e.g., 11-01-04; 12-15-04). Alternatively, the date range can be specified as a first date, and a number indicating a number of days following the first date (e.g., 11-01-04, 45). A date can be specified in any useful format, including date strings or day numbers. During the period in which the document is the currently valid document, the second value is a status flag or token (including a NULL value), indicating this state; this is called the current interval. For example, (11-01-04, "open") indicates that the document is currently valid. This indicates that the document will satisfy search that includes a date limitation after the first date. Regardless of the particular implementation, the first date for a given date interval may be referred to as the "open date", and the last date for a given interval may be referred to as the "closed date".

During subsequent indexing passes by the indexing system 110, the indexing system 110 determines whether the document has changed. If there is no change in the document, then the indexing system 110 takes no further action with respect to document. If there has been a change in the document (thus a new instance or version of the document), then the indexing system 110 re-indexes the document. Upon re-indexing, the indexing system 110 closes the current interval, by changing the open status flag to the current date minus one day. For example, if the indexing system 110 indexes the document on Dec. 16, 2004 and determines that the document has changed, then current interval is closed as follows: (11-01-04, 12-15-04), and a new current interval is created, e.g., (12-16-04, "open"). The indexing system 110 maintains each of the date ranges for the document, along with corresponding indexed relevance data (e.g., phrases, relevance statistics, document inlinks, and so forth) for the date range. Thus, each date range and set of relevance data is associated with a particular instance or version of the document. For each of date interval for a given document, the indexing system maintains a unique document identifier, e.g., MD5 (URL, first date), so as to be able to retrieve the appropriate cached document instance. In an embodiment using the primary and secondary indexes, when an indexing pass is completed, the posting lists 214 in the primary index are rescored, re-ranked, and repartitioned.

The determination of whether a given document has changed since the last indexing pass may be made in any number of ways, including using statistical rules, grammatical rules, or similar heuristics. In one embodiment, the indexing system 110 uses the phrases of a document to determine if a document has changed. Each time a document is indexed, the top N topics are identified and maintained as a list in association with the date range information, for example, the top 20 topics for the date range (11-04-04, 12-15-04). The topic list of instance being indexed is then compared with the topic list of a prior document instance, preferably the most recently closed date range. If more than M % of the topics have changed (e.g., 5%), then the document is deemed to have changed, and is re-indexed for all phrases. It should be noted that other methods of determining whether a document has changed may also be used, and that the use of phrase-based indexing is not required. For example, a set of statistical rules may be used based on changes in document length, changes in which terms are most frequent, changes in term frequency, changes in the amount of types of HTML markup, or other measures of document structure or content.

III. Search System

Figure 6:
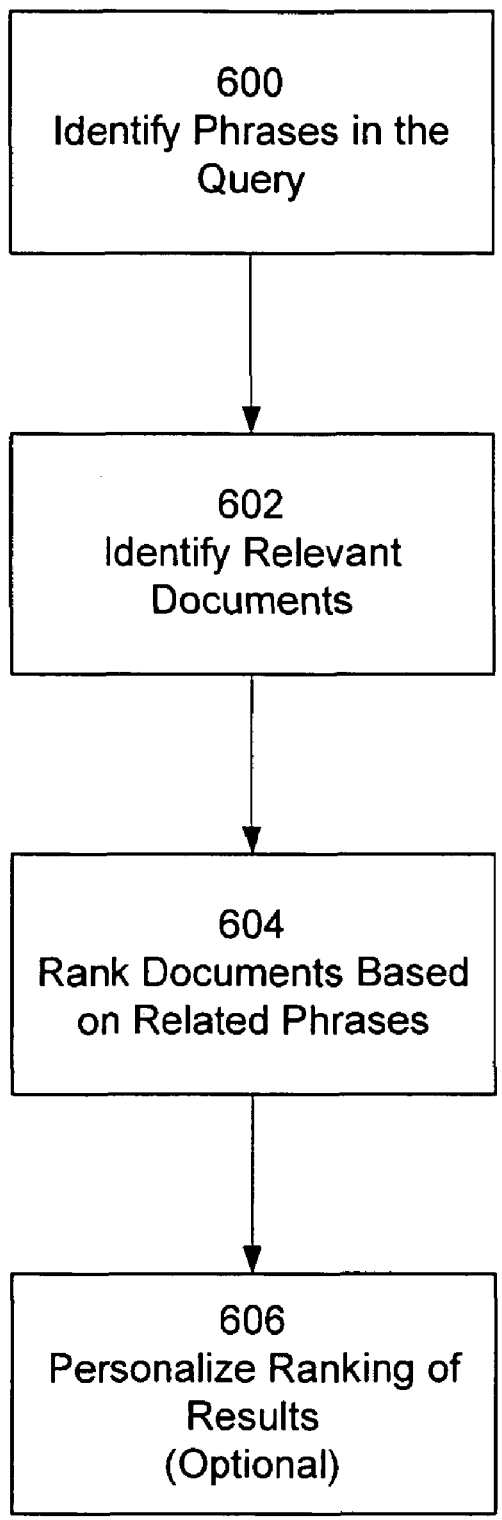
FIG. 6 illustrates a method of retrieving documents based on phrases.

The search system 120 operates to receive a query and search for documents relevant to the query, and provide a list of these documents (with links to the documents) in a set of search results. FIG. 6 illustrates the main functional operations of the search system 120:

600: Identify phrases in the query.
602: Retrieve documents relevant to query phrases.
604: Rank documents in search results according to phrases.

The details of each of these of these stages is as follows.

1. Identification of Phrases in the Query and Query Expansion

The first stage 600 of the search system 120 is to identify any phrases that are present in the query in order to effectively search the index. The following terminology is used in this section:

q: a query as input and receive by the search system 120.
Qp: phrases present in the query.
Qr: related phrases of Qp.
Qe: phrase extensions of Qp.
Q: the union of Qp and Qr.

A query q is received from a client 190, having up to some maximum number of characters or words.

A phrase window of size N (e.g., 5) is used by the search system 120 to traverse the terms of the query q. The phrase window starts with the first term of the query, extends N terms to the right. This window is then shifted right M-N times, where M is the number of terms in the query.

At each window position, there will be N terms (or fewer) terms in the window. These terms constitute a possible query phrase. The possible phrase is looked up in the good phrase list 208 to determine if it is a good phrase or not. If the possible phrase is present in the good phrase list 208, then a phrase number is returned for phrase; the possible phrase is now a candidate phrase.

After all possible phrases in each window have been tested to determine if they are good candidate phrases, the search system 120 will have a set of phrase numbers for the corresponding phrases in the query. These phrase numbers are then sorted (declining order).

Starting with the highest phrase number as the first candidate phrase, the search system 120 determines if there is another candidate phrase within a fixed numerical distance within the sorted list, i.e., the difference between the phrase numbers is within a threshold amount, e.g. 20,000. If so, then the phrase that is leftmost in the query is selected as a valid query phrase Qp. This query phrase and all of its sub-phrases is removed from the list of candidates, and the list is resorted and the process repeated. The result of this process is a set of valid query phrases Qp.

For example, assume the search query is "Hillary Rodham Clinton Bill on the Senate Floor". The search system 120 would identify the following candidate phrases, "Hillary Rodham Clinton Bill on," "Hillary Rodham Clinton Bill," and "Hillary Rodham Clinton". The first two are discarded, and the last one is kept as a valid query phrase. Next the search system 120 would identify "Bill on the Senate Floor", and the subsphrases "Bill on the Senate", "Bill on the", "Bill on", "Bill", and would select "Bill" as a valid query phrase Qp. Finally, the search system 120 would parse "on the senate floor" and identify "Senate Floor" as a valid query phrase.

Next, the search system 120 adjusts the valid phrases Qp for capitalization. When parsing the query, the search system 120 identifies potential capitalizations in each valid phrase. This may be done using a table of known capitalizations, such as "united states" being capitalized as "United States", or by using a grammar based capitalization algorithm. This produces a set of properly capitalized query phrases.

The search system 120 then makes a second pass through the capitalized phrases, and selects only those phrases are leftmost and capitalized where both a phrase and its sub-phrase is present in the set. For example, a search on "president of the united states" will be capitalized as "President of the United States".

In the next stage, the search system 120 identifies 602 the documents that are relevant to the query phrases Q. The search system 120 then retrieves the posting lists of the query phrases Q, and where necessary, intersects these lists to determine which documents appear on the all (or some number) of the posting lists for the query phrases. If a phrase Q in the query has a set of phrase extensions Qe (as further explained below), then the search system 120 first forms the union of the posting lists of the phrase extensions, prior to doing the intersection with the posting lists. The search system 120 identifies phrase extensions by looking up each query phrase Q in the incomplete phrase list 216, as described above.

Using the primary index 150 and the secondary 150, the search system 120 can further optimize the intersection operation. There are four general cases of intersection analysis that the search system 120 has to handle based on whether the query phrases are common or rare.

The first case is for single query phrase, which can be either common or rare. In this case, the search system 120 passes a selected number (e.g., 100 or 1000) of the first entries in the phrase's posting list from the primary index 150 to the ranking phase 604 for final ranking. The ranking phase can optimize the ranking operation since the documents are already in rank order. Alternatively, since these are already pre-ranked by their relevance to the phrase, the set of documents can be directly provided as the search results, providing essentially instantaneous results to the user.

The second case is where there are two common query phrases. Here, the search system 120 accesses the posting lists 214 for each phrase in the primary index 150 and intersects these lists to form the final document list, which is then passed to the ranking phrase 604 for relevance scoring based on the set of relevance attributes associated with document. Because there are at least K documents in each posting list, there is a very high likelihood of a sufficient number documents containing both phrases, and thus intersection of the secondary entries in the secondary index 152 is not necessary. This further reduces the amount of time needed for retrieval.

The third case is where there are two rare query phrases. This case is treated in the same manner as the second care, since here the entire posting list for each phrase is stored in the primary index.

The final case is where the valid query phrases comprise a common phrase and a rare phrase. In this case, the search system 120 first intersects the posting lists 214 from the primary index 150 for both phrases to form a first set or common documents. Next, the search system 120 intersects the posting list for the rare phrase with the secondary entries for the common phrase (which are already sorted in document number order) to form a second set of common documents. The two sets are conjoined and then passed to ranking phase.

All instances where there are three or more query phrases can be reductively handled by one successive intersections using the above methods.

2. Ranking a) Ranking Documents Based on Contained Phrases

The search system 120 provides a ranking stage 604 in which the documents in the search results are ranked, using the relevance information and document attributes, along with the phrase information in each document's related phrase bit vector, and the cluster bit vector for the query phrases. This approach ranks documents according to the phrases that are contained in the document, or informally "body hits."

As described above, for any given phrase $g_j$, each document d in the $g_j$'s posting list has an associated related phrase bit vector that identifies which related phrases $g_k$ and which secondary related phrases $g_l$ are present in document d. The more related phrases and secondary related phrases present in a given document, the more bits that will be set in the document's related phrase bit vector for the given phrase. The more bits that are set, the greater the numerical value of the related phrase bit vector.

Accordingly, in one embodiment, the search system 120 sorts the documents in the search results according to the value of their related phrase bit vectors. The documents containing the most related phrases to the query phrases Q will have the highest valued related phrase bit vectors, and these documents will be the highest-ranking documents in the search results.

This approach is desirable because semantically, these documents are most topically relevant to the query phrases. Note that this approach provides highly relevant documents even if the documents do not contain a high frequency of the input query terms q, since related phrase information was used to both identify relevant documents, and then rank these documents. Documents with a low frequency of the input query terms may still have a large number of related phrases to the query terms and phrases and thus be more relevant than documents that have a high frequency of just the query terms and phrases but no related phrases.

In a second embodiment, the search system 120 scores each document in the result set according which related phrases of the query phrase Q it contains. This is done as follows:

Given each query phrase Q, there will be some number N of related phrases Qr to the query phrase, as identified during the phrase identification process. As described above, the related query phrases Qr are ordered according to their information gain from the query phrase Q. These related phrases are then assigned points, started with N points for the first related phrase Qr1 (i.e., the related phrase Qr with the highest information gain from Q), then N−1 points for the next related phrase Qr2, then N−2 points for Qr3, and so on, so that the last related phrase QrN is assigned 1 point.

Each document in the search results is then scored by determining which related phrases Qr of the query phrase Q are present, and giving the document the points assigned to each such related phrase Qr. The documents are then sorted from highest to lowest score.

As a further refinement, the search system 120 can cull certain documents from the result set. In some cases documents may be about many different topics; this is particularly the case for longer documents. In many cases, users prefer documents that are strongly on point with respect to a single topic expressed in the query over documents that are relevant to many different topics.

To cull these latter types of documents, the search system 120 uses the cluster information in the cluster bit vectors of the query phrases, and removes any document in which there are more than a threshold number of clusters in the document. For example, the search system 120 can remove any documents that contain more than two clusters. This cluster threshold can be predetermined, or set by the user as a search parameter.

b) Ranking Documents Based on Anchor Phrases

In addition to ranking the documents in the search results based on body hits of query phrases Q, in one embodiment, the search system 120 also ranks the documents based on the appearance of query phrases Q and related query phrases Qr in anchors to other documents. In one embodiment, the search system 120 calculates a score for each document that is a function (e.g., linear combination) of two scores, a body hit score and an anchor hit score.

For example, the document score for a given document can be calculated as follows:

Score=0.30*(body hit score)+0.70*(anchor hit score).

The weights of 0.30 and 0.70 can be adjusted as desired. The body hit score for a document is the numerical value of the highest valued related phrase bit vector for the document, given the query phrases Qp, in the manner described above. Alternatively, this value can directly obtained by the search system 120 by looking up each query phrase Q in the index 150, accessing the document from the posting list of the query phrase Q, and then accessing the related phrase bit vector.

The anchor hit score of a document d a function of the related phrase bit vectors of the query phrases Q where Q is an anchor term in a document that references document d. When the indexing system 110 indexes the documents in the document collection, it maintains for each phrase a list of the documents in which the phrase is anchor text in an outlink, and also for each document a list of the inlinks (and the associated anchor text) from other documents. The inlinks for a document are references (e.g. hyperlinks) from other documents (referencing documents) to a given document.

To determine the anchor hit score for a given document d then, the search system 120 iterates over the set of referencing documents R (i=1 to number of referencing documents) listed in index by their anchor phrases Q, and sums the following product:

$R_i$.Q.Related phrase bit vector*D.Q.Related phrase bit vector.

The product value here is a score of how topical anchor phrase Q is to document D. This score is here called the "inbound score component." This product effectively weights the current document D's related bit vector by the related bit vectors of anchor phrases in the referencing document R. If the referencing documents R themselves are related to the query phrase Q (and thus, have a higher valued related phrase bit vector), then this increases the significance of the current document D score. The body hit score and the anchor hit score are then combined to create the document score, as described above.

Next, for each of the referencing documents R, the related phrase bit vector for each anchor phrase Q is obtained. This is a measure of how topical the anchor phrase Q is to the document R. This value is here called the outbound score component.

From the index 150 then, all of the (referencing document, referenced document) pairs are extracted for the anchor phrases Q. These pairs are then sorted by their associated (outbound score component, inbound score component) values. Depending on the implementation, either of these components can be the primary sort key, and the other can be the secondary sort key. The sorted results are then presented to the user. Sorting the documents on the outbound score component makes documents that have many related phrases to the query as anchor hits, rank most highly, thus representing these documents as "expert" documents. Sorting on the inbound document scores makes documents that are frequently referenced by the anchor terms the most highly ranked.

c) Ranking Documents based on Date Range Relevance

The search system 120 can use the date range information in several ways during the search and ranking operations. First, the search system 120 can use the date range as an explicit search delimiter. For example, a query may include terms or phrases and a date, such as "United States Patent and Trademark Office Dec. 4, 2004". The search system 120 can identify the date term, and then select documents that have the desired phrase and which are indexed for a date range that includes the date term in the query. From the selected documents, the search system 120 can then obtain a relevance score for each document using the indexed relevance data associated with the date range. In this manner, an older or previous instance of a document may be retrieved instead of the current instance where it is more relevant to the search query. This is particularly useful for documents and pages that change frequently, such as the home pages of news sites and other sites containing frequently changing information.

Second, where no date term is included in a search query, the search system 120 can use the date information in the index during relevance ranking, by weighting document relevance scores according to how old they are, so that older documents have their relevance scores down weighted (or newer documents are more highly weighted). Alternatively, in some cases, it is older versions of a document that are most relevant to a topic, rather than the most current version of a document. For example, news portal sites contemporaneously created at the time of historical events are likely to be more relevant to a specific query about the event, then current instances of the new portal. In this case, the search system 120 can upweight older document instances, where for example, the pattern of document relevance scores for all of the instances of a document shows an increase around some historical date, followed by decreasing relevance scores for more current instances of the document.

Where one or more date terms are included in the search query, as above, documents may have their relevance scores down weighted in proportion to the difference between the date term and the document date range, so that documents that are either much older than the date range (measured from either the open or the close date) or much newer than the desired date terms have their relevance scored down weighted. Conversely, a relevance score can be increased instead of down weighted where the date range for the document is closer to the desired date.

Third, the search system 120 can use the date range information as either a primary or secondary factor for ordering the search results. For examples, documents can be grouped in reversed chronological order (e.g. monthly groups), and within each group, the documents can be listed from most to least relevant to the search query.

Another use of the data range information is to rank documents based on the frequency with which they are updated. The search system 120 can determine the number of instances of a given document (e.g., number of discrete date ranges) over an interval of time (this count can be maintained during indexing). The number of instances is then used to upweight those documents which are more frequently updated.

IV. Identifying Spam Documents

In another aspect the invention provides system and methods for identifying spam documents as they are being indexed and when queries are being processed. As discussed above with respect to FIG. 5, following indexing of documents with respect to phrases and related phrases. for each document d, there will be known:

i) each good phrase $g_j$ in document d;

ii) for each good phrase $g_j$ which of its related phrases $g_k$ are present in document d;

iii) for each related phrase $g_k$ present in document d, which of its related phrases $g_l$ (the secondary related phrases of $g_j$) are also present in document d.

From the foregoing, the number of the related phrases present in a given document will be known. A normal, non-spam document will generally have a relatively limited number of related phrases, typically on the order of between 8 and 20, depending on the document collection. By contrast, a spam document will have an excessive number of related phrases, for example on the order of between 100 and 1000 related phrases. Thus, the present invention takes advantage of this discovery by identifying as spam documents those documents that have a statistically significant deviation in the number of related phrases relative to an expected number of related phrases for documents in the document collection.

One embodiment of this aspect of the invention is as follows. A table of spam documents (SPAM_TABLE) is created for storing the document IDs of the documents deemed to be spam documents (the table will initially be empty). This is preferably done during the indexing operations described above.

The index 150 is traversed with respect to the documents (either all or a significant sample). For each document, there will be a set good phrases in the document, and for each of these good phrases, there will be a number of related phrases. An expected number E of related phrases is determined across the traversed documents, with respect to the good phrases; the standard deviation of this number is also determined. In one embodiment the medium (50% percentile) number of related phrases is used as expected number of related phrases in a document.

For each document in the index 150, the actual number N of related phrases for each good phrase is determined. Hence, if there are 20 phrases in the document, then there will be a vector of 20 values for N for the document). This number of related phrases will be the total of the bits set in the related phrase bit vectors for each good phrase in the document. For each phrase then, number N is compared against the expected number E of related phrases. The results of this comparison, either individually for each good phrase, or collectively for some number of good phrases, are used to determine whether the document is a spam document. There a variety of different tests that can be used to identify a spam document.

A spam document may be indicated if the actual number N of related phrases significantly exceeds the expected number E, for some minimum number of good phrases. In one implementation, N significantly exceeds E where it is at least some multiple number of standard deviations greater than E, for example, more than five standard deviations. In another implementation, N significantly exceeds E where it is greater by some constant multiple, for example N>2E. Other comparison measures can also be used as a basis for determining that the actual number N of related phrases significantly exceeds the expected number E. In another embodiment, N is simply compared with a predetermined threshold value, such as 100 (which is deemed to be maximum expected number of related phrases).

Using any of the foregoing tests, it is determined whether this condition is met for some minimum number of good phrases. The minimum may be a single phrase, or perhaps three good phrases. If there are a minimum number of good phrases which have an excessive number of related phrases present in the document, then the document is deemed to a spam document. The document is then added to the SPAM_TABLE.

Another embodiment maintains a different form of the SPAM_TABLE. In this embodiment, the table is organized by phrase, and for each phrase, there is list of one or more documents that include the phrase and which are deemed to be spam documents. This version of the SPAM_TABLE is constructed as follows. For each document, the top N (e.g. N=3) most significant phrases are determined. This will be the phrases for which their related phrase bit vectors have the leftmost (most significant) bits set. As described above, the bits in the related phrase bit vector are sorted by decreasing information gain for the related phrase. Thus the most significant bits are associated with the related phrases with the highest information gain.

For each of these most significant related phrases, the number of related phrases present in the document is determined, again from their related phrase bit vectors. If the actual number of related phrases significantly exceeds the expected number (using any of the above described tests), then document is deemed a spam document with respect to that most significant phrase. Accordingly the document is added to the SPAM_TABLE for the good phrase under consideration. The document is also added as a spam document for each the related phrases of that good phrase, since a document is considered a spam document with respect to all phrases that are related to each other.

The foregoing approaches to identifying a spam document are preferably implemented as part of the indexing process, and may be conducted in parallel with other indexing operations, are afterwards.

The SPAM_TABLE is then used when processing a search query, as follows. A search query is received from a client 190, and is processed as described above by the search system 120 to search the index 150 based on phrases in the query and related phrases. The search system 120 retrieves some set of results, say a 1000 documents, each of which is identified by its document ID, and has an associated relevance score. For each document in the search result set, the search system 120 looks up the document ID in the SPAM_TABLE (however constructed), to determine if the document is included therein.

If the document is included in the SPAM_TABLE, then the document's relevance score is down weighted by predetermined factor. For example, the relevance score can be divided by factor (e.g., 5). Alternatively, the document can simply be removed from the result set entirely.

The search result set is then resorted by relevance score and provided back to the client 190.

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are the means used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer program product stored on one or more non-transitory computer readable storage media and comprising instructions that, when executed, cause an apparatus to:
   determine, for a document that contains a first phrase, an expected number of related phrases that are related to the first phrase and are expected to be present in the document;
   determine for the document, and for the first phrase in the document, an actual number of related phrases present in the document; and
   identify the document as a spam document by comparing the actual number of related phrases present in the document with the expected number of related phrases,
   wherein determining the expected number of related phrases includes:
      traversing an index of a plurality of documents;
      for each of the indexed documents, determining a set of phrases in the document, and for each phrase in the set, determining a number of related phrases also in the document; and determining the expected number of related phrases based on the determined number of related phrases across the traversed documents.

2. The computer program product of claim 1, wherein determining the expected number of related phrases based on the determined number of related phrases across the traversed documents includes determining the expected number of related phrases as a medium of the determined number of related phrases across the traversed documents.

3. The computer program product of claim 1, wherein identifying the document as a spam document, further comprises:
   determining, for a second phrase contained in the document, a number of the related phrases related to a second phrase expected to be present in the document;
   determining for the document, and for the second phrase in the document, an actual number of related phrases present in the document;
   determining, for a third phrase contained in the document, a number of the related phrases related to a third phrase expected to be present in the document;
   determining for the document, and for the third phrase in the document, an actual number of related phrases present in the document; and
   identifying the document as a spam document when the actual number of related phrases present in the document for any of the first phrase, the second phrase, or the third phrase exceeds the expected number of related phrases.

4. The computer program product of claim 1, wherein the determination of the number of the related phrases expected to be present in the document is based on a statistical analysis of a plurality of documents that include the first phrase and related phrases, and wherein identifying the document as a spam document, further comprises:
   determining a standard deviation of the expected number of related phrases; and
   responsive to the actual number of related phrases present in the document exceeding the expected number of related phrases by at least a multiple of a standard deviation of the expected number of related phrases, identifying the document as a spam document.

5. The computer program product of claim 1, wherein identifying the document as a spam document, further comprises:
   responsive to the actual number of related phrases present in the document exceeding the expected number of related phrases by at least a multiple of the expected number of related phrases, identifying the document as a spam document.

6. The computer program product of claim 1, wherein identifying the document as a spam document, further comprises:
   determining, for a second phrase contained in the document, a number of the related phrases related to a second phrase expected to be present in the document;
   determining for the document, and for the second phrase in the document, an actual number of related phrases present in the document;
   determining, for a third phrase contained in the document, a number of the related phrases related to a third phrase expected to be present in the document;
   determining for the document, and for the third phrase in the document, an actual number of related phrases present in the document;
   identifying the document as a spam document where, for each of the first phrase, the second phrase, and the third phrase, the actual number of related phrases present in the document exceeds the expected number of related phrases based on a threshold.

7. The computer program product of claim 1, wherein identifying the document as a spam document, further comprises:
   identifying the document as a spam document when the actual number of related phrases present in the document exceeds a predetermined maximum expected number of related phrases.

8. The computer program product of claim 1, wherein identifying the document as a spam document, further comprises:
   determining for a document, a first most significant phrase, a second most significant phrase, and a third most significant phrase present in the document, wherein the first phrase is the most significant phrase;
   determining, for the second most significant phrase, a number of the related phrases related to a second most significant phrase expected to be present in the document;
   determining, for the third most significant phrase, a number of the related phrases related to a third most significant phrase expected to be present in the document;
   for each of the first, second, and third most significant phrases, determining an actual number of related phrases present in the document; and
   responsive to the actual number of related phrases exceeding the expected number of related phrases for each of the first, second, and third most significant phases based on a threshold, identifying the document as a spam document.

9. The computer program product of claim 1, wherein identifying the document as a spam document, further comprises:
   determining for a document, first, second, and third most significant phrases present in the document, wherein the first phrase is the most significant phrase;
   determining, for the second most significant phrase, a number of the related phrases related to a second most significant phrase expected to be present in the document;
   determining, for the third most significant phrase, a number of the related phrases related to a third most significant phrase expected to be present in the document;
   for each of the first, second, and third most significant phrases, determining an actual number of related phrases present in the document; and
   responsive to the actual number of related phrases exceeding the expected number of related phrases for any of the first, second, or third most significant phases based on a threshold, identifying the document as a spam document.

10. The computer program product of claim 1, further comprising instructions that, when executed, cause the apparatus to:
    add the identified document to a spam list that includes a list of spam documents.

11. The computer program product of claim 9, further comprising instructions that, when executed, cause the apparatus to:
    add the identified document to a spam list that includes a list of spam documents associated with the most significant phrase; and
    for each related phrase of the most significant phrase, add the identified document to a list of spam documents associated with the related phrase.

12. The computer program product of claim 1, further comprising instructions that, when executed, cause the apparatus to add the identified document to a spam list of documents based on the comparison indicating that the actual number of related phrases exceeds the expected number of related phrases.

13. The computer program product of claim 1, wherein the determination of the number of the related phrases expected to be present in the document is based on a statistical analysis of a plurality of documents that include the phrase and related phrases.

14. The computer program product of claim 1, wherein identifying the document as a spam document based on the comparison of the actual number of related phrases present in the document with the expected number of related phrases indicating that the actual number of related phrases present in the document exceeds the expected number of related phrases.

15. The computer program product of claim 1, further comprising instructions that, when executed, cause the apparatus to:
    receive a search query;
    determine a set of documents that match the search query; and
    determine a relevance of each document of the set to the search query, wherein the relevance depends on whether the document is listed on a spam list.

16. A computer program product stored on one or more non-transitory computer readable storage media and comprising instructions that, when executed, cause an apparatus to:
    receive a search query;
    retrieve a set of documents relevant to the search query, each document having a relevance score;
    determine, for each document in the set of documents, whether the document has been identified as a spam document;
    down-weight the relevance score of the document in response to a document being identified as a spam document; and
    organize the set of documents by their relevance scores, wherein the relevance scores by which the documents are organized include down-weighted relevance scores for documents that have been identified as spam documents,
    wherein whether the document has been identified as a spam document is based on:
    determining, for a document that contains a first phrase, a number of related phrases related to the first phrase expected to be present in the document;
    determining for the document, and for the first phrase in the document, an actual number of related phrases present in the document; and
    identifying the document as a spam document by comparing the actual number of related phrases present in the document with the expected number of related phrases,
    wherein determining the number of related phrases expected to be present in the document includes:
        traversing an index of a plurality of documents;
        for each of the indexed documents, determining a set of phrases in the document, and for each phrase in the set, determining a number of related phrases also in the document; and
        determining the expected number of related phrases based on the determined number of related phrases across the traversed documents.

17. The computer program product of claim 16, wherein whether the document has been identified as a spam document is further based on:
    determining, for a second phrase contained in the document, a number of the related phrases related to a second phrase expected to be present in the document;
    determining for the document, and for the second phrase in the document, an actual number of related phrases present in the document;
    determining, for a third phrase contained in the document, a number of the related phrases related to a third phrase expected to be present in the document;
    determining for the document, and for the third phrase in the document, an actual number of related phrases present in the document; and
    identifying the document as a spam document when the actual number of related phrases present in the document for any of the first phrase, the second phrase, or the third phrase exceeds the expected number of related phrases for the respective first, second, or third phrase.

18. The computer program product of claim 16, wherein whether the document has been identified as a spam document is further based on:
    determining, for a second phrase contained in the document, a number of the related phrases related to a second phrase expected to be present in the document;
    determining for the document, and for the second phrase in the document, an actual number of related phrases present in the document;
    determining, for a third phrase contained in the document, a number of the related phrases related to a third phrase expected to be present in the document;
    determining for the document, and for the third phrase in the document, an actual number of related phrases present in the document;
    identifying the document as a spam document where, for each of the first phrase, the second phrase, and the third phrase, the actual number of related phrases present in the document exceeds the expected number of related phrases based on a threshold.

19. A computer system comprising:
    one or more memories configured for storing executable instructions; and
    one or more processors configured for executing the instructions, wherein the instructions include instructions to:
        determine, for a document that contains a first phrase, an expected number of related phrases that are related to the first phrase and are expected to be present in the document;
        determine for the document, and for the first phrase in the document, an actual number of related phrases present in the document; and
        identify the document as a spam document by comparing the actual number of related phrases present in the document with the expected number of related phrases,
        wherein determining the expected number of related phrases includes:
            traversing an index of a plurality of documents;
            for each of the indexed documents, determining a set of phrases in the document, and for each phrase in the set, determining a number of related phrases also in the document; and
            determining the expected number of related phrases based on the determined number of related phrases across the traversed documents.

20. The computer system of claim 19, wherein
determining the expected number of related phrases based on the determined number of related phrases across the traversed documents includes determining the expected number of related phrases as a medium of the determined number of related phrases across the traversed documents.

21. The computer system of claim 19, wherein the instructions to identify the document as a spam document include instructions to:
determine, for a second phrase contained in the document, a number of the related phrases related to a second phrase expected to be present in the document;
determine for the document, and for the second phrase in the document, an actual number of related phrases present in the document;
determine, for a third phrase contained in the document, a number of the related phrases related to a third phrase expected to be present in the document;
determine for the document, and for the third phrase in the document, an actual number of related phrases present in the document; and
identify the document as a spam document when the actual number of related phrases present in the document for any of the first phrase, the second phrase, or the third phrase exceeds the expected number of related phrases.

22. The computer system of claim 19, wherein the determination of the number of the related phrases expected to be present in the document is based on a statistical analysis of a plurality of documents that include the first phrase and related phrases, and wherein the instructions to identify the document as a spam document include instructions to:
determine a standard deviation of the expected number of related phrases; and
responsive to the actual number of related phrases present in the document exceeding the expected number of related phrases by at least a multiple of a standard deviation of the expected number of related phrases, identify the document as a spam document.

23. The computer system of claim 19, wherein the instructions to identify the document as a spam document include instructions to:
responsive to the actual number of related phrases present in the document exceeding the expected number of related phrases by at least a multiple of the expected number of related phrases, identify the document as a spam document.

24. The computer system of claim 19, wherein the instructions to identify the document as a spam document include instructions to:
determine, for a second phrase contained in the document, a number of the related phrases related to a second phrase expected to be present in the document;
determine for the document, and for the second phrase in the document, an actual number of related phrases present in the document;
determine, for a third phrase contained in the document, a number of the related phrases related to a third phrase expected to be present in the document;
determine for the document, and for the third phrase in the document, an actual number of related phrases present in the document;
identify the document as a spam document where, for each of the first phrase, the second phrase, and the third phrase, the actual number of related phrases present in the document exceeds the expected number of related phrases based on a threshold.

25. The computer system of claim 19, wherein the instructions to identify the document as a spam document include instructions to:
identify the document as a spam document when the actual number of related phrases present in the document exceeds a predetermined maximum expected number of related phrases.

26. The computer system of claim 19, wherein the instructions to identify the document as a spam document include instructions to:
determine for a document, a first most significant phrase, a second most significant phrase, and a third most significant phrase present in the document, wherein the first phrase is the most significant phrase;
determine, for the second most significant phrase, a number of the related phrases related to a second most significant phrase expected to be present in the document;
determine, for the third most significant phrase, a number of the related phrases related to a third most significant phrase expected to be present in the document;
for each of the first, second, and third most significant phrases, determine an actual number of related phrases present in the document; and
responsive to the actual number of related phrases exceeding the expected number of related phrases for each of the first, second, and third most significant phases based on a threshold, identify the document as a spam document.

27. The computer system of claim 19, wherein the instructions to identify the document as a spam document include instructions to:
determine for a document, first, second, and third most significant phrases present in the document, wherein the first phrase is the most significant phrase;
determine, for the second most significant phrase, a number of the related phrases related to a second most significant phrase expected to be present in the document;
determine, for the third most significant phrase, a number of the related phrases related to a third most significant phrase expected to be present in the document;
for each of the first, second, and third most significant phrases, determine an actual number of related phrases present in the document; and
responsive to the actual number of related phrases exceeding the expected number of related phrases for any of the first, second, or third most significant phases based on a threshold, identify the document as a spam document.

28. The computer system of claim 19, wherein the instructions further include instructions to:
add the identified document to a spam list that includes a list of spam documents.

29. The computer program product of claim 28, wherein the instructions further include instructions to:
add the identified document to a spam list that includes a list of spam documents associated with the most significant phrase; and
for each related phrase of the most significant phrase, add the identified document to a list of spam documents associated with the related phrase.

30. The computer system of claim 19, wherein the instructions further include instructions to: add the identified document to a spam list of documents based on the comparison indicating that the actual number of related phrases exceeds the expected number of related phrases.

31. The computer system of claim 19, wherein the determination of the number of the related phrases expected to be present in the document is based on a statistical analysis of a plurality of documents that include the phrase and related phrases.

32. The computer system of claim 19, wherein identifying the document as a spam document based on the comparison of the actual number of related phrases present in the document with the expected number of related phrases indicating that the actual number of related phrases present in the document exceeds the expected number of related phrases.

33. The computer system of claim 19, wherein the instructions further include instructions to:
receive a search query;
determine a set of documents that match the search query; and
determine a relevance of each document of the set to the search query, wherein the relevance depends on whether the document is listed on a spam list.

34. A computer system comprising:
one or more memories configured for storing executable instructions; and
one or more processors configured for executing the instructions, wherein the instructions include instructions to:
receive a search query;
retrieve a set of documents relevant to the search query, each document having a relevance score;
determine, for each document in the set of documents, whether the document has been identified as a spam document;
down-weight the relevance score of the document in response to a document being identified as a spam document; and
organize the set of documents by their relevance scores, wherein the relevance scores by which the documents are organized include down-weighted relevance scores for documents that have been identified as spam documents,
wherein whether the document has been identified as a spam document is based on:
determining, for a document that contains a first phrase, a number of related phrases related to the first phrase expected to be present in the document;
determining for the document, and for the first phrase in the document, an actual number of related phrases present in the document; and
identifying the document as a spam document by comparing the actual number of related phrases present in the document with the expected number of related phrases,
wherein determining the number of related phrases expected to be present in the document includes:
traversing an index of a plurality of documents;
for each of the indexed documents, determining a set of phrases in the document, and for each phrase in the set, determining a number of related phrases also in the document; and
determining the expected number of related phrases based on the determined number of related phrases across the traversed documents.

35. The computer system of claim 34, wherein whether the document has been identified as a spam document is further based on:
determining, for a second phrase contained in the document, a number of the related phrases related to a second phrase expected to be present in the document;
determining for the document, and for the second phrase in the document, an actual number of related phrases present in the document;
determining, for a third phrase contained in the document, a number of the related phrases related to a third phrase expected to be present in the document;
determining for the document, and for the third phrase in the document, an actual number of related phrases present in the document; and
identifying the document as a spam document when the actual number of related phrases present in the document for any of the first phrase, the second phrase, or the third phrase exceeds the expected number of related phrases for the respective first, second, or third phrase.

36. The computer system of claim 34, wherein whether the document has been identified as a spam document is further based on:
determining, for a second phrase contained in the document, a number of the related phrases related to a second phrase expected to be present in the document;
determining for the document, and for the second phrase in the document, an actual number of related phrases present in the document;
determining, for a third phrase contained in the document, a number of the related phrases related to a third phrase expected to be present in the document;
determining for the document, and for the third phrase in the document, an actual number of related phrases present in the document;
identifying the document as a spam document where, for each of the first phrase, the second phrase, and the third phrase, the actual number of related phrases present in the document exceeds the expected number of related phrases based on a threshold.

* * * * *

UNITED STATES PATENT AND TRADEMARK OFFICE
CERTIFICATE OF CORRECTION

| | | |
|---|---|---|
| PATENT NO. | : 8,078,629 B2 | Page 1 of 1 |
| APPLICATION NO. | : 12/578339 | |
| DATED | : December 13, 2011 | |
| INVENTOR(S) | : Anna Lynn Patterson | |

It is certified that error appears in the above-identified patent and that said Letters Patent is hereby corrected as shown below:

On the first page, in field (56), under "Other Publications", in column 2, line 1, delete "though" and insert -- through --, therefor.

In column 26, line 31, in claim 8, delete "phases" and insert -- phrases --, therefor.

In column 26, line 51, in claim 9, delete "phases" and insert -- phrases --, therefor.

In column 30, line 27, in claim 26, delete "phases" and insert -- phrases --, therefor.

In column 30, line 48, in claim 27, delete "phases" and insert -- phrases --, therefor.

In column 30, line 54, in claim 29, delete "program product" and insert -- systems --, therefor.

Signed and Sealed this
Twenty-eighth Day of February, 2012

David J. Kappos
*Director of the United States Patent and Trademark Office*